(12) United States Patent
Medina

(10) Patent No.: US 6,570,768 B2
(45) Date of Patent: May 27, 2003

(54) PLUGGABLE TRANSCEIVER MODULE WITH EXTENDED RELEASE AND REMOVAL LEVER

(75) Inventor: Raul Medina, Chicago, IL (US)

(73) Assignee: Stratos Lightwave, Chicago, IL (US)

( * ) Notice: Subject to any disclaimer, the term of this patent is extended or adjusted under 35 U.S.C. 154(b) by 308 days.

(21) Appl. No.: 09/802,052

(22) Filed: Mar. 8, 2001

(65) Prior Publication Data

US 2002/0093796 A1 Jul. 18, 2002

Related U.S. Application Data

(63) Continuation-in-part of application No. 09/727,943, filed on Nov. 30, 2000.

(51) Int. Cl.$^7$ ................................................. H05K 7/00
(52) U.S. Cl. ........................ 361/747; 361/728; 439/352
(58) Field of Search ................. 439/352, 357, 439/728–729, 731–732; 361/740, 741, 747, 754, 756, 759, 801, 802, 785, 798; 385/88–89, 92, 94

(56) References Cited

U.S. PATENT DOCUMENTS

| 5,546,281 | A | | 8/1996 | Poplawski et al. | 361/752 |
|---|---|---|---|---|---|
| 5,717,533 | A | | 2/1998 | Poplawski et al. | 361/752 |
| 5,734,558 | A | | 3/1998 | Poplawski et al. | 361/752 |
| 5,755,587 | A | * | 5/1998 | Sakai et al. | 439/352 |
| 5,820,398 | A | | 10/1998 | Stabroth et al. | 439/352 |
| 5,864,468 | A | | 1/1999 | Poplawski et al. | 361/753 |
| 5,879,173 | A | | 3/1999 | Poplawski et al. | 438/138 |
| 5,980,324 | A | | 11/1999 | Berg et al. | 439/630 |
| 6,072,228 | A | | 6/2000 | Hinkle et al. | 257/666 |
| 6,142,802 | A | | 11/2000 | Berg et al. | 439/180 |
| 6,142,828 | A | | 11/2000 | Pepe | 439/610 |
| 6,149,465 | A | | 11/2000 | Berg et al. | 439/630 |
| 6,224,414 | B1 | * | 5/2001 | Fukuda | 439/352 |
| 6,335,869 | B1 | * | 1/2002 | Branch et al. | 361/816 |
| 6,371,787 | B1 | * | 4/2002 | Branch et al. | 439/352 |
| 6,409,534 | B1 | * | 6/2002 | Weisz-Margulescu | 439/367 |
| 6,447,170 | B1 | * | 9/2002 | Takahashi et al. | 385/53 |
| 6,461,186 | B1 | * | 10/2002 | Endo | 439/352 |
| 6,485,322 | B1 | * | 11/2002 | Branch et al. | 439/357 |

OTHER PUBLICATIONS

Small Form–factor Pluggable (SFP) Transceiver Multi-Source Agreement (MSA) document dated Sep. 14, 2000.

* cited by examiner

*Primary Examiner*—David Martin
*Assistant Examiner*—Phuong T. Vu
(74) *Attorney, Agent, or Firm*—Steven M. Evans

(57) ABSTRACT

A pluggable transceiver module having a housing with a first side and a face perpendicular to the first side, and a tab extending above the surface of the first side sized to mate with a slot in a receptacle for the housing, a wedge slidably mounted on the first side proximate the tab, and a lever attached to the wedge extending beyond the face of the housing, wherein pressing the lever causes the wedge to slide between the tab and the slot on the receptacle and remove the tab from within the slot, thereby releasing the transceiver module from the receptacle, and the lever further including a recess enabling a person to at least partially insert a fingernail to easily grip and remove the pluggable transceiver module from the receptacle.

15 Claims, 27 Drawing Sheets

PLUGGABLE TRANSCEIVER MODULE WITH EXTENDED RELEASE AND REMOVAL LEVER

CONTINUATION-IN-PART APPLICATION

This application is a continuation-in-part (CIP) application of U.S. patent application having Ser. No. 09/727,943, filed on Nov. 30, 2000, and titled "Transceiver Module with Extended Release Lever."

FIELD OF THE INVENTION

The present invention relates generally to transceiver modules, and more particularly, to a pluggable transceiver module having an extended release and removal lever.

BACKGROUND OF THE INVENTION

Optoelectronic transceivers are utilized to interconnect circuit cards of communication links and other electronic modules or assemblies. Various international and industry standards define the type of connectors used to interface computers to external communication devices such as modems, network interfaces, and other transceivers. A well-known type of transceiver module developed by an industry consortium and known as a Gigabit Interface Converter (GBIC) provides an interface between a computer and an Ethernet, Fibre Channel, or other data communication environment. U.S. patents identified under issued U.S. Pat. Nos. 5,879,173, 5,864,468, 5,734,558, 5,717,533, and U.S. Pat. No. Re 36,820, originally assigned to Methode Electronics, Inc, and now assigned to Stratos Lightwave, both in Chicago, Ill., disclose pluggable transceiver modules. Applicant hereby incorporates by reference U.S. Pat. Nos. 5,879, 173, 5,864,468, 5,734,558, 5,717,533, and U.S. Pat. No. Re 36,820.

It is desirable to miniaturize transceivers in order to increase the port density associated with the network connection (switch boxes, cabling patch panels, wiring closets, computer I/O, etc.). Various standards are known that define form factors for miniaturized electronic devices, such as the Small Form-Factor Pluggable (SFP) standard that specifies an enclosure 9.8 millimeters in height by 13.5 millimeters in width and having a minimum of 20 electrical input/output connections. The specific standards for SFP transceivers are set forth in the "Small Form-Factor Pluggable (SFP) Transceiver Multisource Agreement (MSA)," dated Sep. 14, 2000, which Applicant hereby incorporates by reference.

In order to maximize the available number of transceivers per area, multiple SFP transceivers modules are generally arranged in rows and columns. Each SFP transceiver module is plugged into a receptacle or receptacle. These receptacles are generally stacked to maximize the number of available transceiver modules per allotted area. In such stacked configurations, a release mechanism is necessary to remove a transceiver module from within a receptacle. The release lever generally is located on the bottom and embedded behind the face of the transceiver module. A special tool or probe must be inserted into a small slit on an external face of the transceiver module in order to access and depress the release mechanism. The requirement of a tool for removing the transceiver module is not only inconvenient, but also prevents an operator from removing a transceiver module if he or she does not have a tool at the appropriate time. The requirement of a tool results in increased installation cost and/or repair time.

Accordingly, there is a need for a pluggable transceiver module having a release mechanism that is easily accessible to an operator and does not require any tools to operate.

OBJECTS AND SUMMARY OF THE INVENTION

In view of the foregoing, it is an object of the present invention to provide a release mechanism for a transceiver module that does not require a tool to operate.

A second object of the present invention is to provide an easily operable release mechanism at minimal cost.

A third object of the present invention is to provide a lever that functions as both a release and a removal lever.

Another object of the present invention is to provide a release and removal mechanism that can be operated by a finger.

A further object of the present invention is to provide a release and removal mechanism that can be easily assembled.

An additional object of the present invention is to provide a release and removal mechanism for a transceiver module that does not increase the overall height and width of the transceiver module.

According to the present invention, a pluggable transceiver module is provided having a housing with a first side and a face perpendicular to the first side, and a tab extending above the surface of the first side sized to mate with a slot in a receptacle for the housing, a wedge slidably mounted on the first side proximate the tab, and a lever attached to the wedge extending beyond the face of the housing, wherein pressing the lever causes the wedge to slide between the tab and the slot on the receptacle and remove the tab from within the slot, thereby releasing the transceiver module from the receptacle, and the lever further including a recess enabling a person to at least partially insert a fingernail to easily grip and remove the pluggable transceiver module from the receptacle.

DETAILED DESCRIPTION OF THE PRESENTLY PREFERRED EMBODIMENTS

Figure 1:
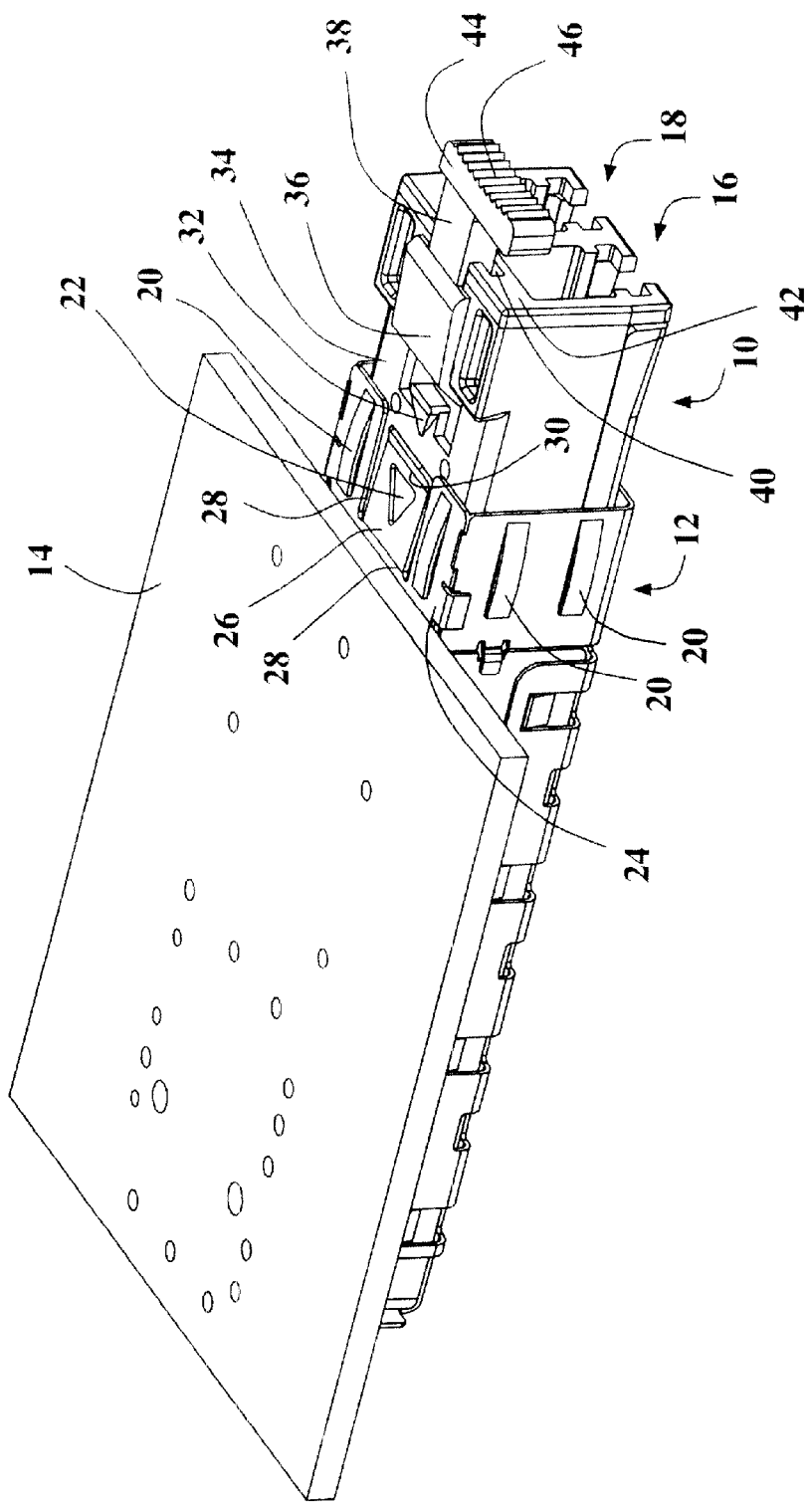
FIG. 1 is a perspective view of a circuit board having a receptacle and a transceiver module partially inserted therein in accordance with the present invention.

Referring now to the drawings, FIG. 1 shows a transceiver module 10, a socket or receptacle 12, and a Printed Circuit Board (PCB) 14. The receptacle 12 is mounted to the PCB 14. The transceiver module 10 is partially inserted within the receptacle 12 so that the components of the present invention are more clearly illustrated. The transceiver module 10 includes an optical input 16 and an optical output 18. Contacts 20 are cut and formed out of the receptacle 12. The contacts 20 are designed to contact and ground the receptacle 12 to a stacked array (not shown). The receptacle 12 is preferable constructed of a conductive metal.

The receptacle 12 includes a slot 22 on a base 24 of the receptacle 12. The slot 22 is formed in a bendable portion 26 of the base 24. The bendable portion 26 is formed by cutting slits 28 into the base 24 of the receptacle 12. The bendable portion 26 includes a lip 30. During insertion of the transceiver module 10 into the receptacle 12, a tab 32 on a first side 34 of the transceiver module 10 slides under the lip 30 on the bendable portion 26. The tab 32 includes an inclined surface, in order to more easily slide under the lip 30 during insertion of the transceiver module 10 into the receptacle 12. When the tab 32 is inserted past the lip 30, the tab 32 will eventually enter the slot 22 in the bendable portion 26, securing the transceiver module 10 within the receptacle 12.

The tab 32 and the slot 22 are preferably triangular in shape and sized to mate closely, thus preventing movement of the transceiver module 10 within the receptacle 12.

In order to remove the transceiver module 10 from the receptacle 12, a wedge 36 slides under the lip 30 of the bendable portion 26. The wedge 36 separates the tab 32 from within the slot 22, thus unlocking the transceiver module 10 from the receptacle 12. The wedge 36 is forced between the tab 32 and the slot 22 by a person pressing upon a lever 38 attached to the wedge 36. When a person presses upon the lever 38, the wedge 36 slides under the lip 30 and forces apart the tab 32 from the slot 22, thus unlocking the transceiver module 10 from the receptacle 12.

The wedge 36 is slidably mounted to the first side 34 of the transceiver module 10. The lever 38 is located within a slit 40 in a face 42 of the transceiver module 10. The face 42 is perpendicular to the first side 34 of the transceiver module 10. The lever 38 slides back and forth within the slot 40 on the face 42 of the transceiver module 10.

In accordance with the present invention, the lever 38 extends beyond the face 42 of the transceiver module 10. In this manner, a person can unlock the transceiver module 10 from the receptacle 12 by pushing upon the lever 38 using just a finger. No tool is required to be inserted within the slot 42 in order to access and depress the lever 38. In accordance with a further aspect of the present invention, a foot or dogleg 44 is attached to an external end of the lever 38. The foot 44 includes friction ridges 46 on the surface which facilitation depression of the lever 38 by an operator's finger. The foot 44 maybe integrally formed with the lever 38, for example, by injection molding the entire piece of a polymer material.

Figure 2:
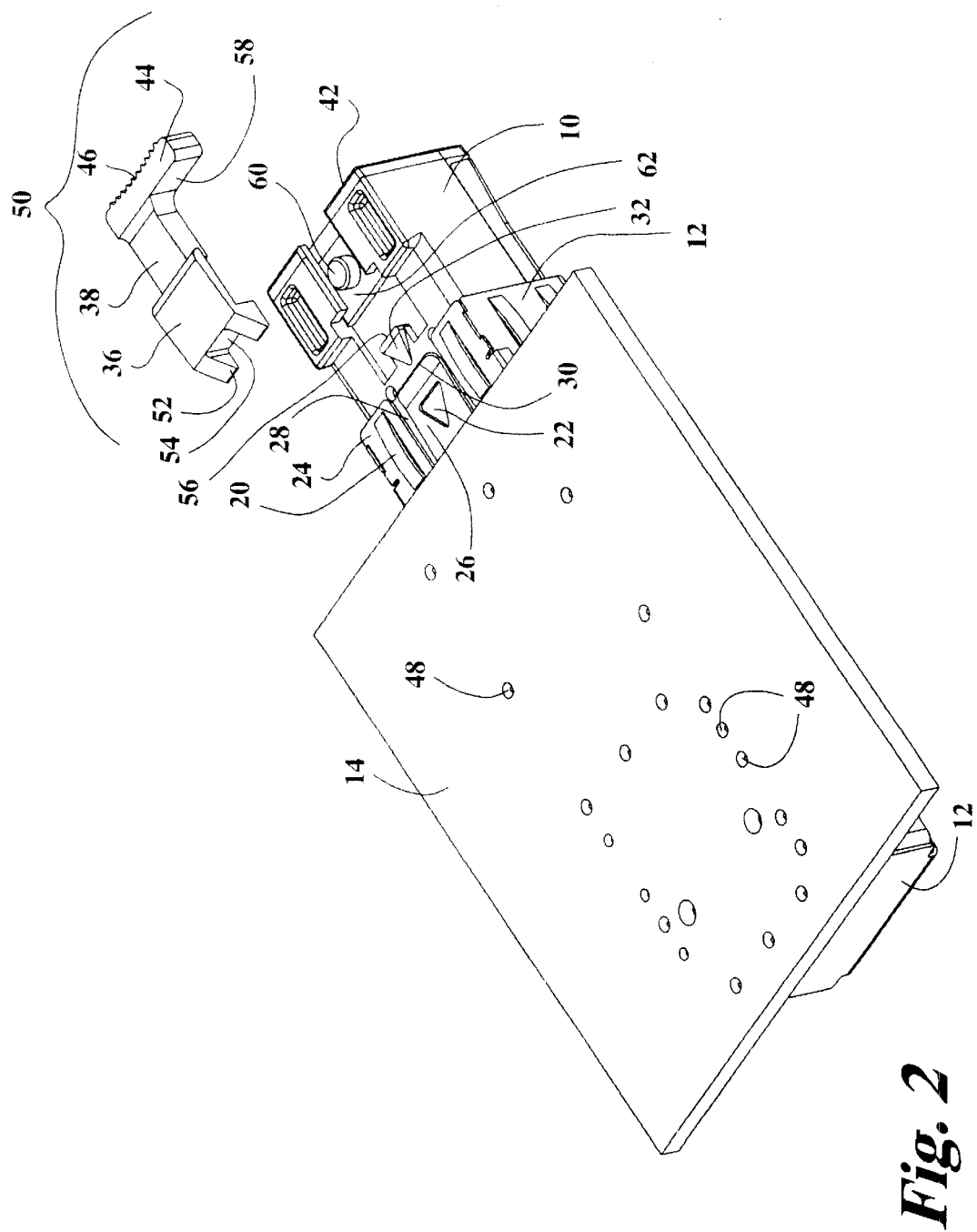
FIG. 2 is a perspective view of the receptacle and transceiver module shown in FIG. 1 at a different angle, wherein the extended release lever of the present invention is shown in exploded view.

FIG. 2 shows the transceiver module 10 and receptacle 12 from a different angle. Holes 48 in the printed circuit board 14 are shown for mounting contacts pins and mounting posts of electrical components. The release lever 50, comprising the foot 44, lever 38, and wedge 36, is shown in an exploded view from the transceiver module 10. In accordance with the present invention, an internal end of the wedge 36 includes inclines 52. These inclines 52 function to facilitate the wedge 36 sliding under the lip 30 and the bendable portion 26 in order to separate and remove the tab 32 from inside the slot 22. The wedge 36 further includes a stop plate 54 that butts up against the back 56 of the tab 32 during insertion of the wedge 36. The stop plate 54 functions to provide a stopping position for the wedge 36 when the foot 44 is pressed. The stop plate 56 prevents the wedge 36 from going past a predetermined position when the foot 44 is pressed. Furthermore, the back 58 of the foot 44 also provides a stop plate 58 that butts up against the face, 42 of the transceiver module 10. The stop plate 58 also functions to prevent the level 38 and wedge 36 from being pushed beyond a predetermined position which could damage the bendable portion 26 of the receptacle 12.

A plug or tab 60 is attached to a slidable member 62. The slidable member 62 is slidably mounted within the slit 40 in the face 42 (FIG. 1) of the transceiver module 10. The release lever 50 can be mounted to the slidable member 62 by gluing, applying heat, other known bonding techniques. The slidable member 62 and plug 60 are preferably a single element formed out of molded or thermal plastic. Similarly, the release lever 50 preferably is a single member formed out of molded or thermal plastic. In other embodiments, the release lever 50 may be formed out of metal.

During assembly of the release lever 50 to the transceiver module 10, the plug 60 fits into an aperture 64 (FIG. 14) in the bottom of the wedge 36. By inserting the plug 60 into the aperture 66 during assembly, the release lever 50 is accurately positioned on the transceiver module 10. Moreover, the release lever 50 can be mounted to the slidable member 62 simply by friction resulting between the tab 60 being inserted into the aperture 64, thus eliminating the need for gluing or heat bonding.

Figure 3:
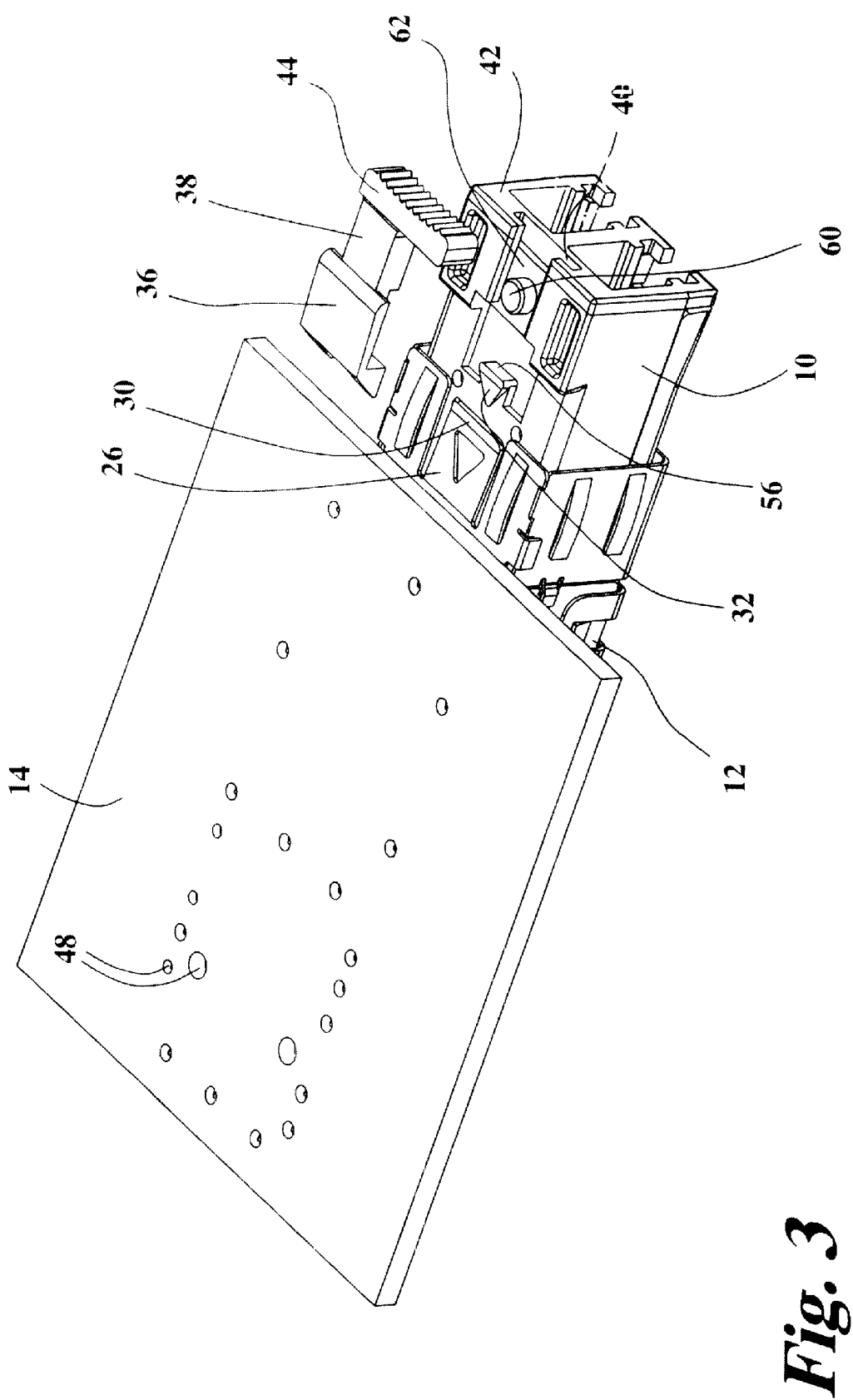
FIG. 3 is perspective view of the receptacle and transceiver module shown in FIG. 2 from a different angle.

FIG. 3 shows the transceiver module 10 and receptacle 12 of FIG. 2 from a different angle. In FIG. 3 the back 56 of the tab 32 is clearly visible. Furthermore, the slidable member 62 within the slit 40 can be easily seen. Lip 30 of the bendable member 26 which receives the tab 32 during insertion of the transceiver module 10 is shown.

Figure 4:
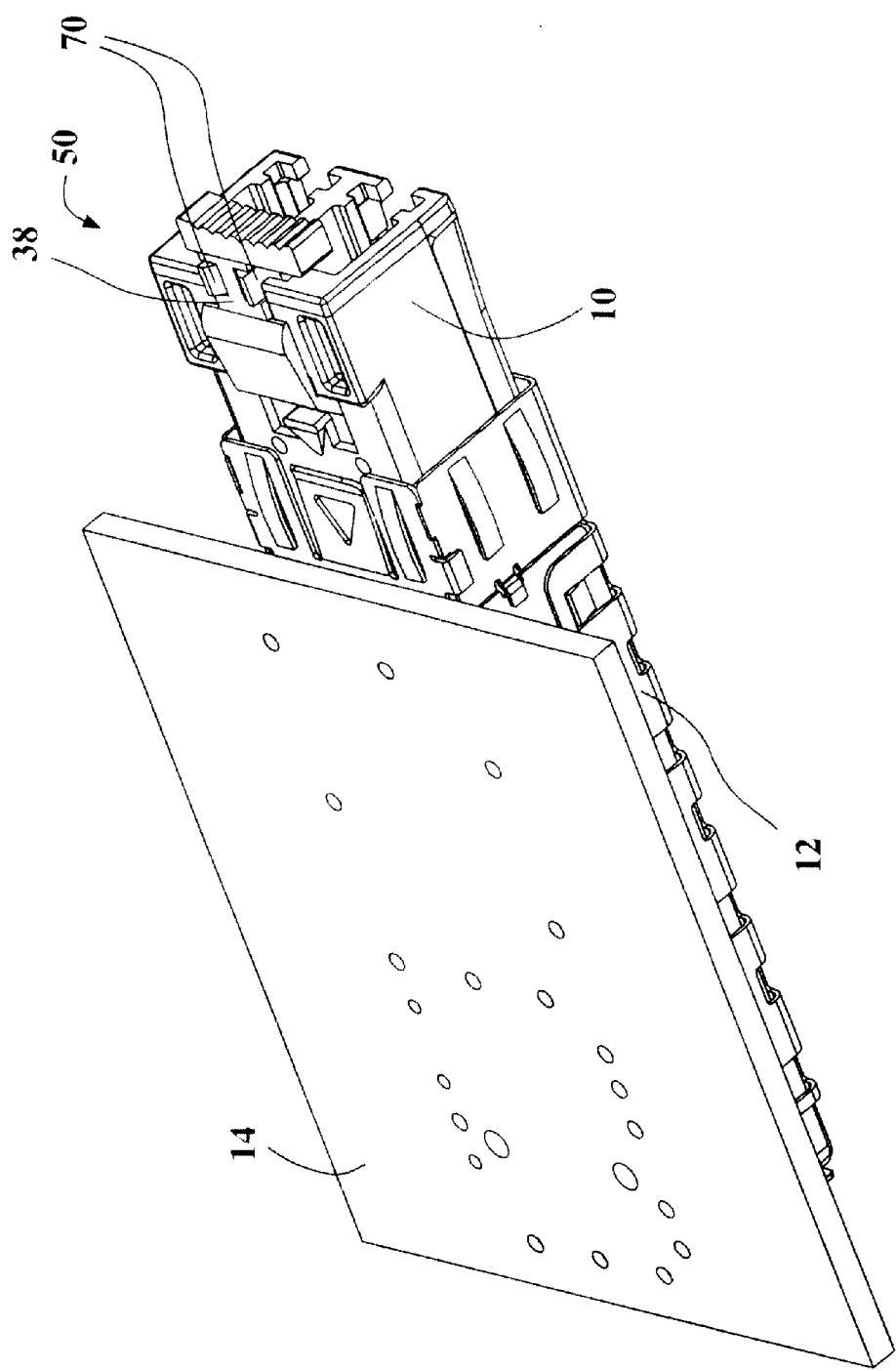
FIG. 4 is a perspective of a receptacle and a transceiver module configured in accordance with a second embodiment of the present invention.

FIG. 4 illustrates a second embodiment of the release lever 50. In the embodiment shown in FIG. 4, the sidable member 62 includes clips 70. The clips 70 and the slidable member 62 preferably are a single element formed out of thermal plastic. The clips 70 clasp onto the lever 38 during assembly of the release lever 50 onto the transceiver module 10. The clips 70 provide an alternative to gluing or heating the release lever 50 to the slidable member 62 during assembly. The clips 70 enable the release lever 50 to be mounted more quickly than bonding. Moreover, the release lever 50 can be easily removed by prying apart the clips 70; an option not available when using glue or heat bonding.

Figure 5:
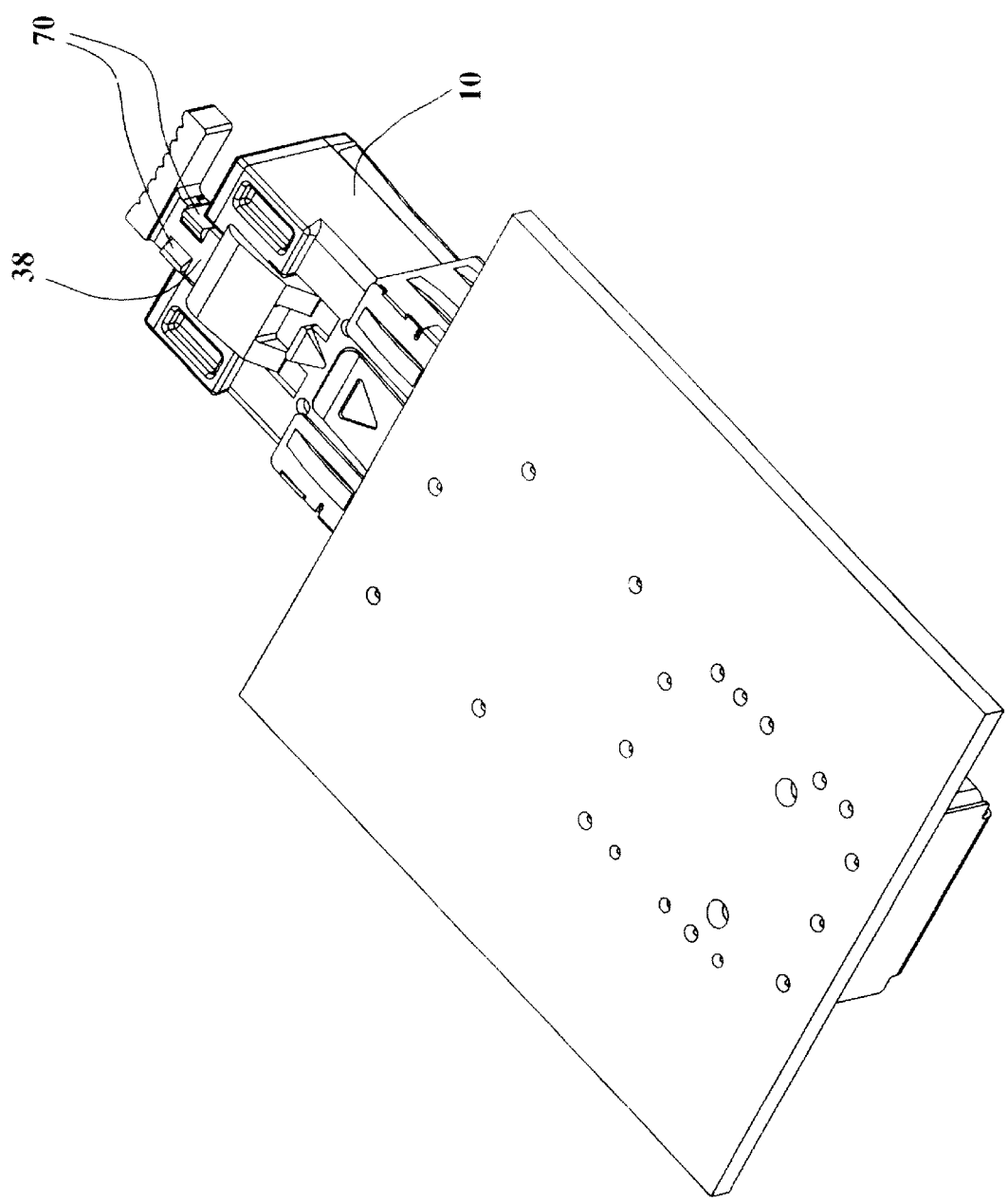
FIG. 5 is a is a perspective view of the receptacle and transceiver module shown in FIG. 4 from a different angle.

FIG. 5 illustrates the clips 70 shown in FIG. 4 from a different angle. FIG. 5 clearly shows the clips 70 clasp around the lever 38 in order to mount the release lever 50 to the transceiver module 10.

Figure 6:
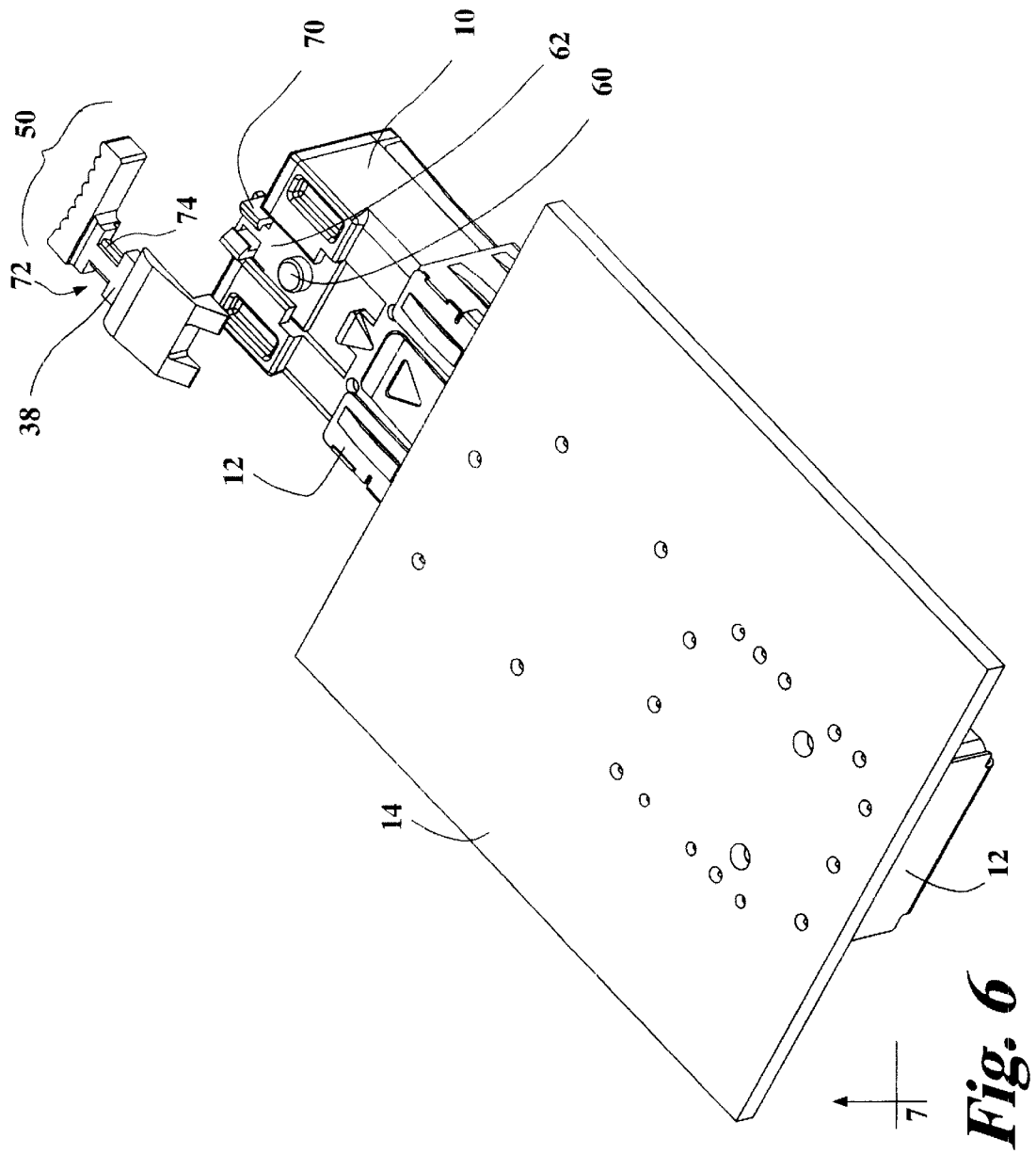
FIG. 6 is a perspective view of the receptacle and transceiver module shown in FIG.5, wherein the extended release lever of the present invention is shown in exploded view.

FIG. 6 illustrates the embodiment shown in FIGS. 4 and 5 wherein the release lever 50 is separated from the slidable member 62. FIG. 6 also illustrates notches 72 in the lever 38 sized for receiving the clips 70. The notches 72 include ridges 74 enabling the clips 70 to clasp onto the lever 38. The notches 72 are provided so that the clips 70 can be included on the slidable member 62 without increasing the outer dimensions or width of the slidable member 62. Thus, the size of the slit 40 in the face 42 of the transceiver module 10 does not need to be increased to accommodate the clips 70. Similarly, the notches 74 enable the clips 70 to clasp onto the lever 38 without increasing the width of the lever 38 when the clips 70 are clasp around the lever 38. This is possible because the clips 70 fit into the notches 72 when the release lever 50 is mounted to the slidable member using the clips 70.

Figure 7:
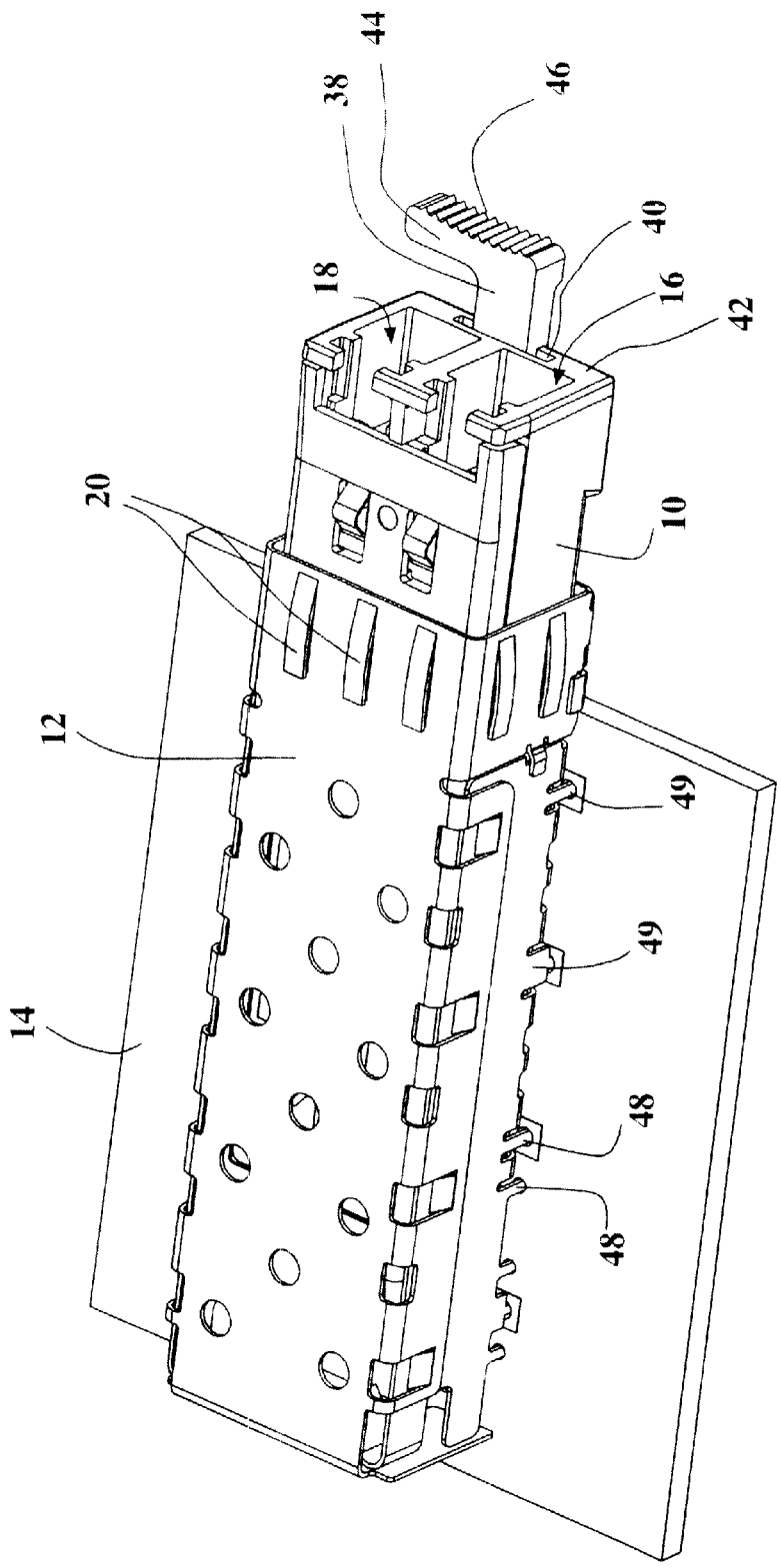
FIG. 7 is a perspective view of the receptacle and transceiver module shown in and taken along line 7—7 in FIG. 6.

FIG. 7 illustrates the transceiver module 10, receptacle 12, and PCB 14 taken along line 7—7 of FIG. 6. FIG. 7 provides a more complete view of the receptacle 12 and the optical input and output sockets 16, 18, respectively. The mounting posts 49 of the receptacle 12 are shown located within the holes 48 of the PCB 14 in order to mount the receptacle 12 to the PCB 14. Contacts 20 on the receptacle 12 are to be connected to ground of a mounting array (not shown) and provided for discharging potential static electrical charge on the transceiver module 10. The contacts 20 also function to provide slight friction and guide the receptacle 12 into a mounting array (not shown). The contacts 20 preferably are formed by cutting out bendable portions out of the metal receptacle 12.

Figure 8:
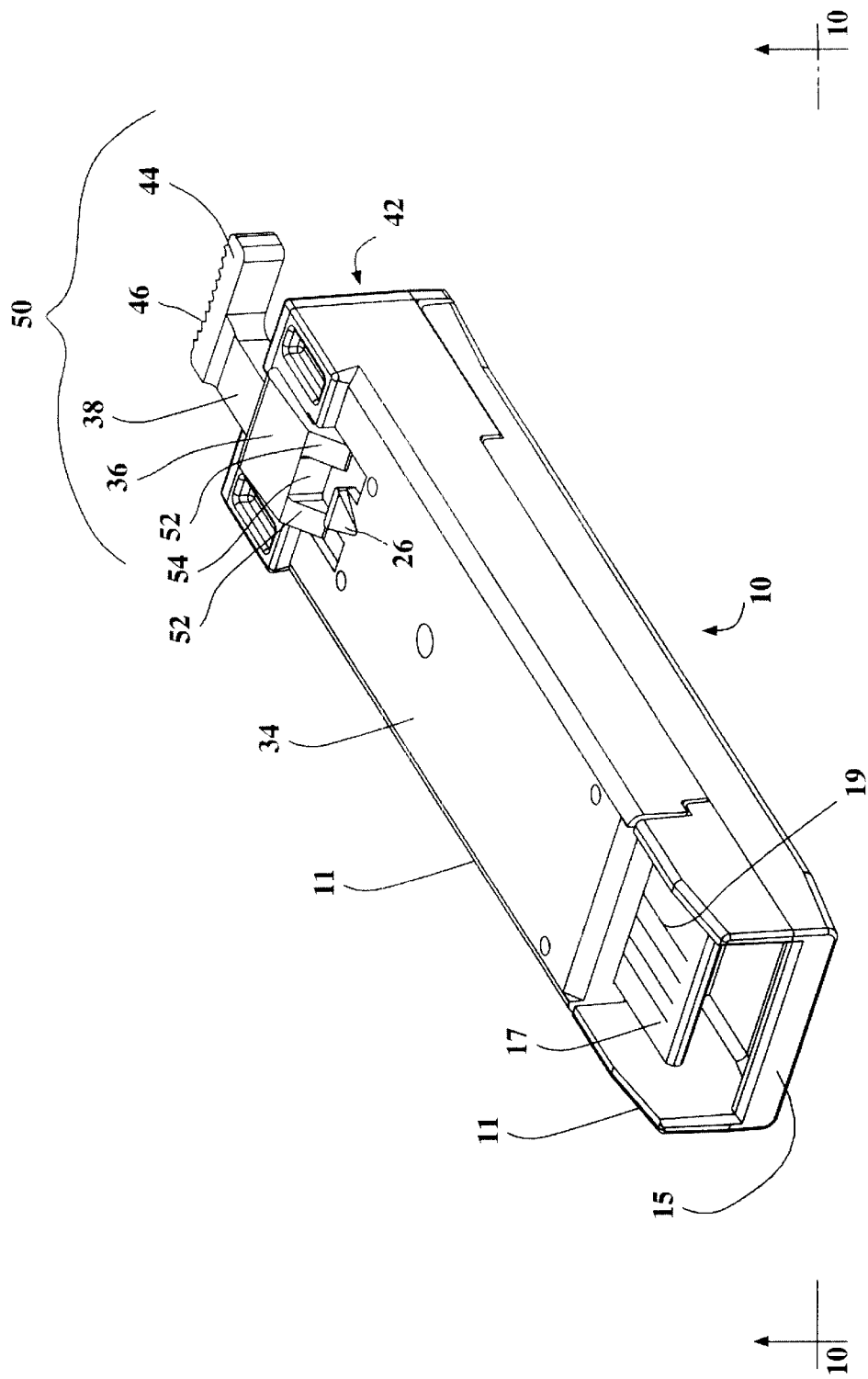
FIG. 8 is a perspective view of the transceiver module shown in FIGS. 1–3.

FIG. 8 illustrates the transceiver module 10 outside the receptacle 12. An internal PCB 17 is contained with the housing 11 of the transceiver module 10 and is exposed at the insertion end 15 of the transceiver module 10. Ribbon contacts or ribbon traces 19 on the internal PCB 17 are exposed to mate with contacts (not shown) within the receptacle 12. The tab 32 is located on the first side 34 of the transceiver module 10. The release lever 50, comprised of the wedge 36, lever 38 and foot 44, is shown on the first side 34 of the transceiver module 10. Incline surfaces 52 and stop plates 54 and 58 of the release lever 50 are also shown.

Figure 9:
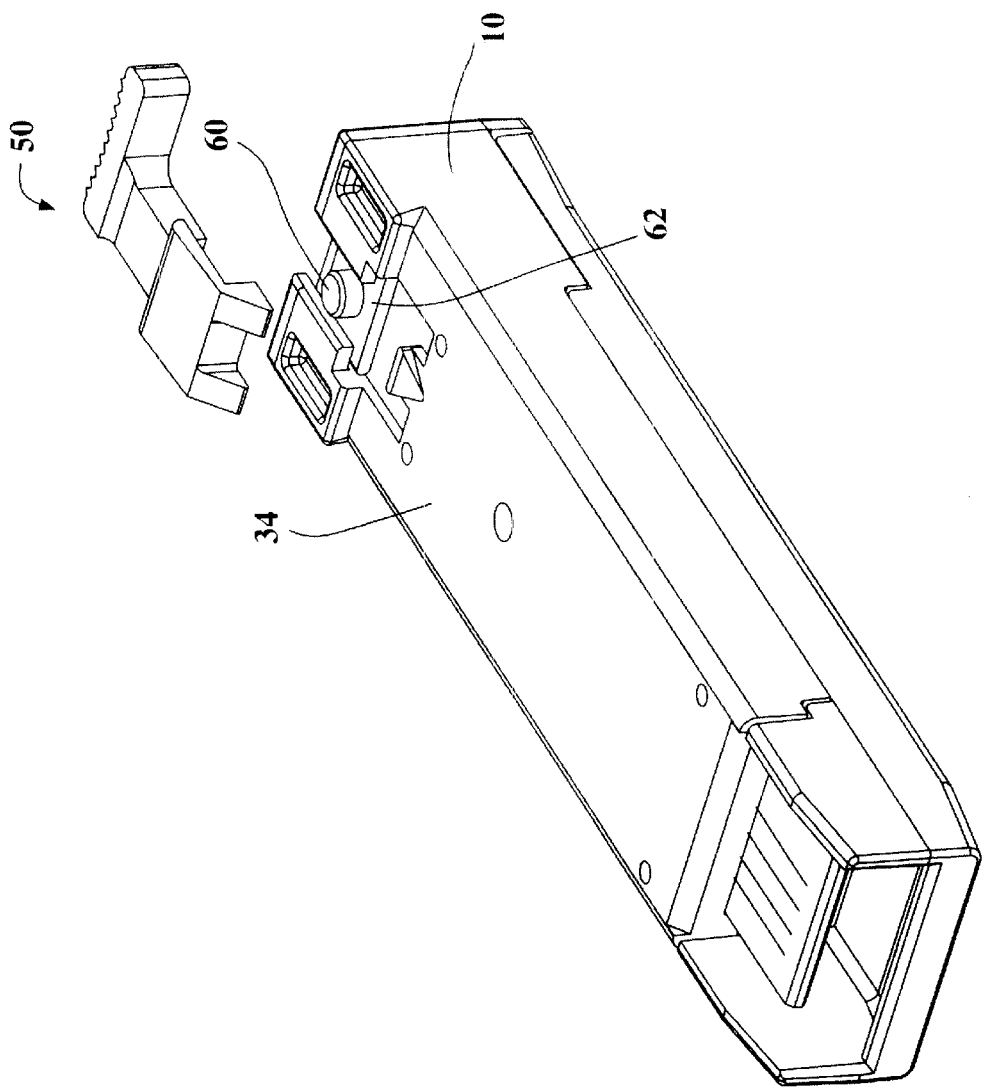
FIG. 9 is a perspective view of the transceiver module shown in FIG. 8, wherein the release lever of the present invention is shown separated from the transceiver module.

FIG. 9 shows the transceiver of FIG. 8 wherein the release lever 50 is shown separated from the first side 34 of the transceiver module 10. The tab 60 and slidable member 62 are also shown.

Figure 10:
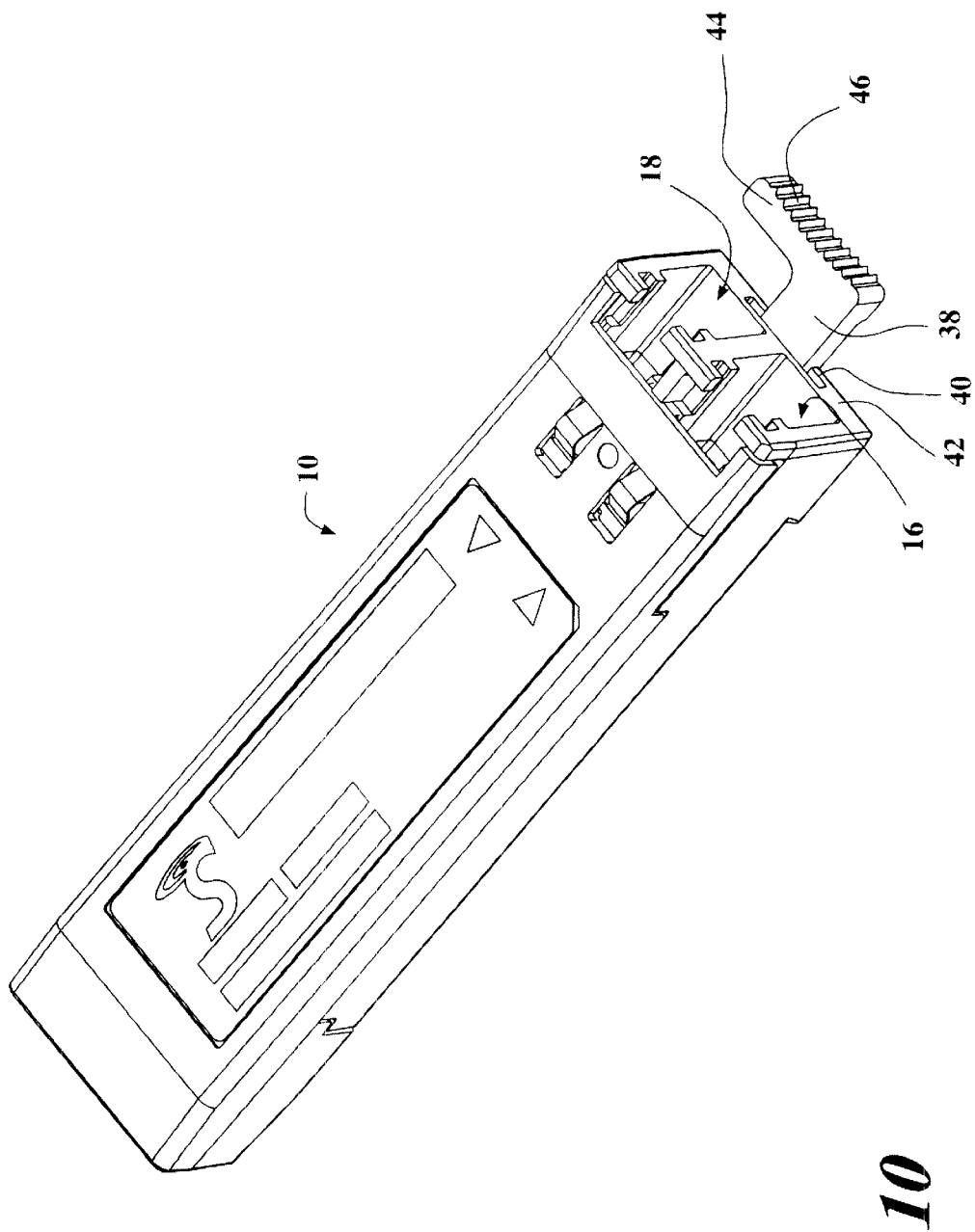
FIG. 10 is a perspective view of the transceiver module shown in FIG. 8 from a different angle.

FIG. 10 illustrates the transceiver module 10 shown in and taken along line 10—10 of FIG. 8. The optical input 16 and optical output 18 are shown. The lever 38 is shown within the slit 40 on the face 42 of the transceiver module 10. The foot 44 and friction ridges 46 are also illustrated.

Figure 11:
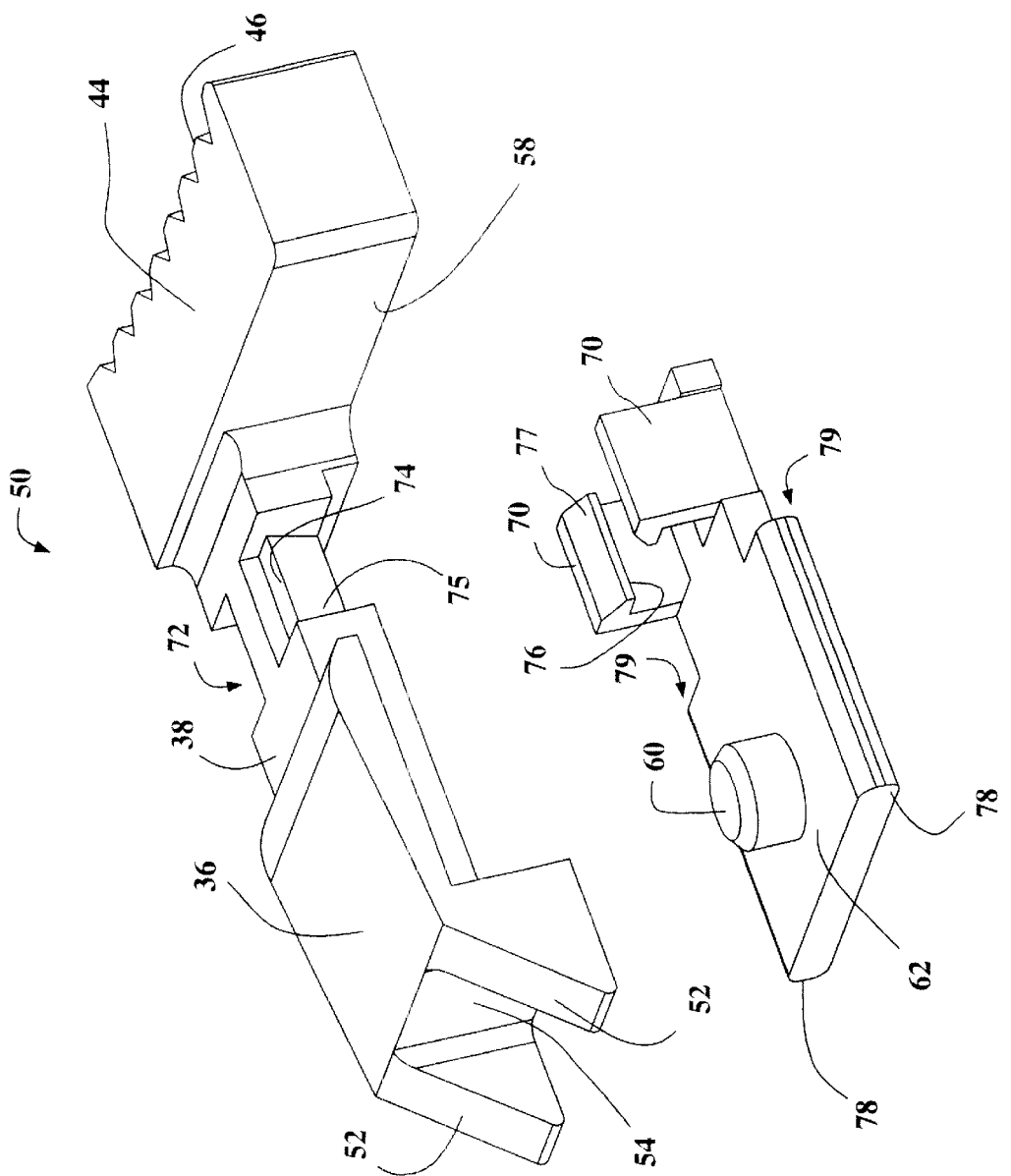
FIG. 11 is an exploded view of the release lever of the present invention shown in FIGS. 4–6.

FIG. 11 is an enlarged, exploded view of the release lever 50 and slidable member 62 shown in FIGS. 4–6. The release lever 50 includes a foot 44, lever 38, and wedge 36. The wedge 36 includes inclines surfaces 52 and stop plate 54. The foot 44 includes stop plate 58 and friction ridges 46. Notches 72 are formed into the lever 38 for receiving the clips 70 on the slidable member 62. An edge 76 on each clip 70 is sized to mate and clasp onto a ridge 74 in a corresponding notch 72 of the lever 38.

The slidable member 62 includes a tab 60 for mating in an aperture 64 (FIG. 14) of the lever 38. Edges 78 of the slidable member 62 are rounded in order to facilitate sliding movement of the slidable member 62 within the slit 40 of the transceiver module 10. The slidable member 62 also include stop plates 79 in order to prevent the slidable member 62 from passing out of the slit 40. The stops plates 79 butt up against edges of the slit 42 when the release lever 50 is not being pressed and is sliding outward from the transceiver module 10.

Figure 12:
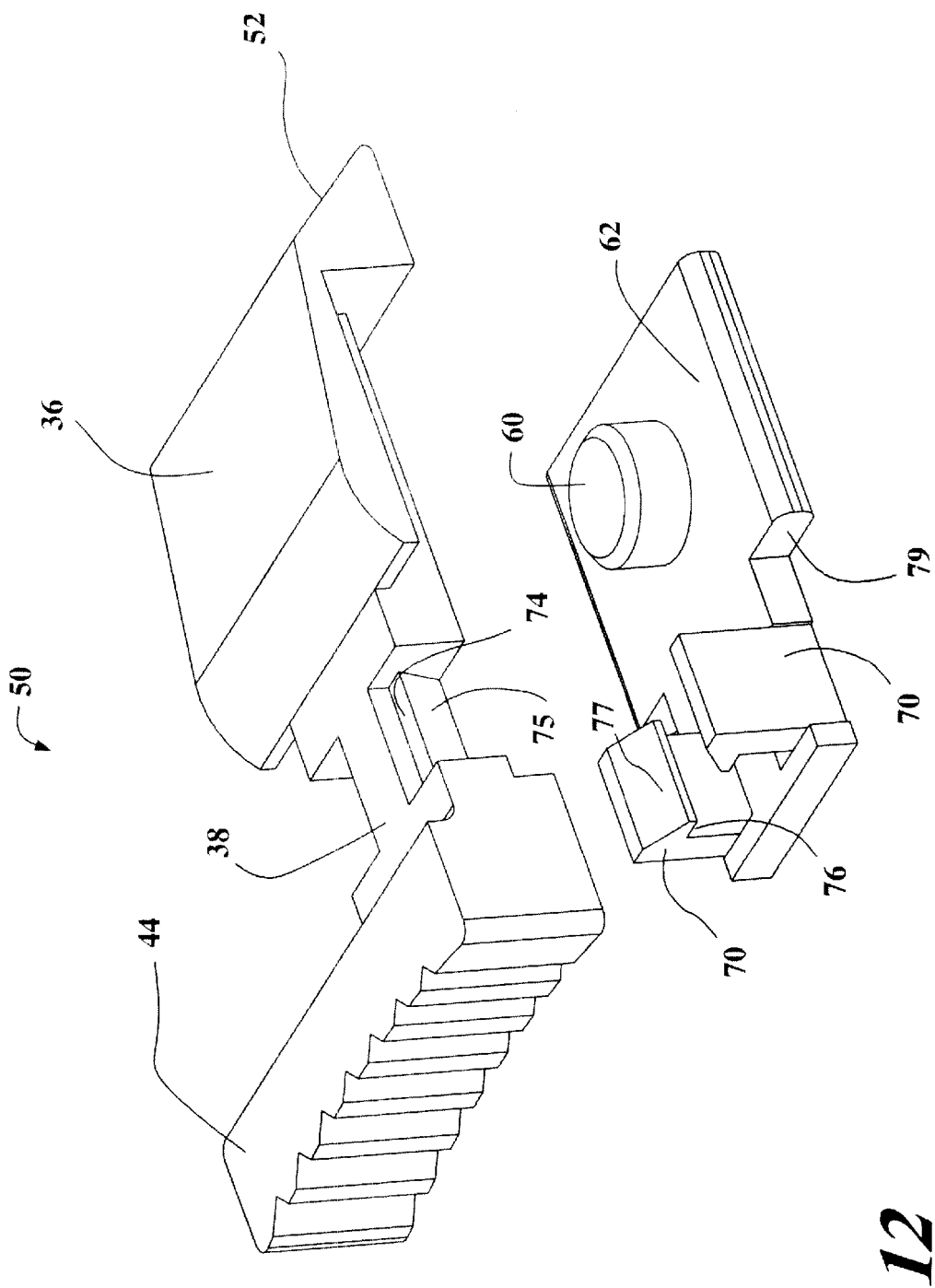
FIG. 12 is an exploded view of the release lever shown in FIG. 11 from a different angle.

FIG. 12 is a perspective view of the release lever 50 and the slidable member 62 shown in FIG. 11 from a different angle. FIG. 12 provides a clearler view of the ridges 74 in notches 72 and the edges 76 of the clips 70. Stop plate 79 of the slidable member also is more clearly illustrated. FIG. 12 also shows inclined surface 75 on the lever 38 adjacent to the ridge 74. An inclined surface 77 of a corresponding clip 70 slides against the inclined surface 75 when the release lever 50 is being attached to the slidable member 62. The combination of inclined surfaces 75 and 77, which meet during assembly of the release lever 50, enable the clips 70 to more easily spread apart and pass around the lever 38 and clasp onto the ridges 74 within the notches 72.

Figure 13:
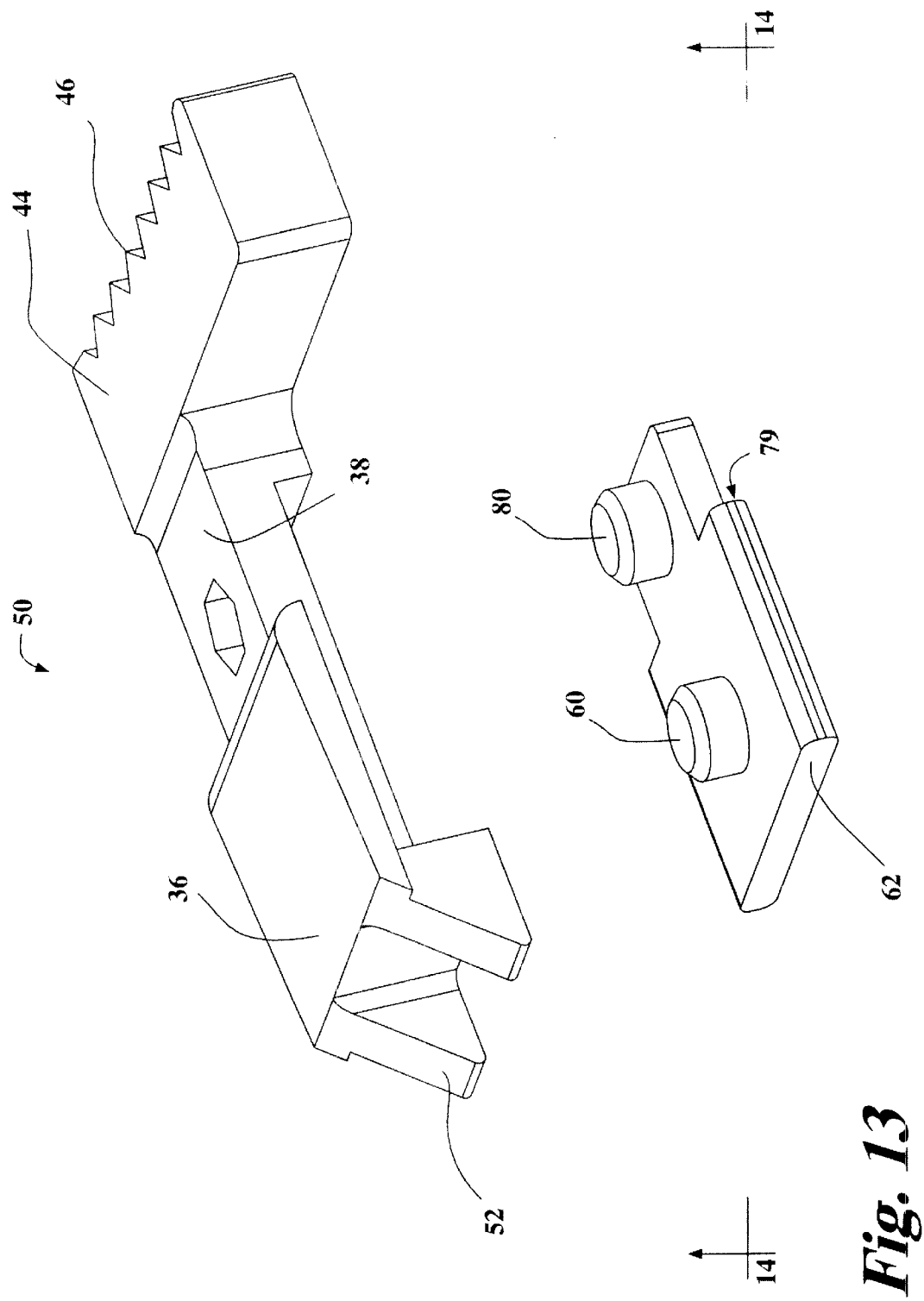
FIG. 13 is an exploded view of a second embodiment of the release lever of the present invention.

FIG. 13 illustrates a further embodiment of the release lever 50 shown in FIGS. 1–3. In the embodiment shown in FIG. 13, a second plug 80 is attached to the slidable member 62. The plug 80 is sized to be received by an aperture 82 in the lever 38. The plugs 60 and 80 are illustrated as being circular is shape, but the plugs 60 and 80 may be square, rectangular, octagonal, oval, or other shapes in other embodiments. Similarly, the aperture 82 in the lever 38 is shown as being a hexagon shape in order to provide a tight bound with the plug 80. In other embodiments, the aperture 82 can be round, square, octagonal, oval, or other shapes. Furthermore, the aperture 82 does not have to pass all the way through the lever 38 as shown in FIG. 13.

The release lever 50 is mounted to the slidable member 62 by inserting the plugs 60 and 80 into the corresponding apertures 64 (FIG. 14) and 82 of the lever 38. The release lever 50 can be mounted to the slidable member 62 based solely on friction between the plugs 60,80 and the apertures 64, 82, assuming the fit is relatively tight. However, adhesive or heat may be utilized to increase the strength of the bound between the slidable member 62 and the release lever 50. Regardless, the plugs 60,80 mate with apertures 64,82 is order to accurately position the release lever 50 into a predetermined location on the slidable member 38.

Figure 14:
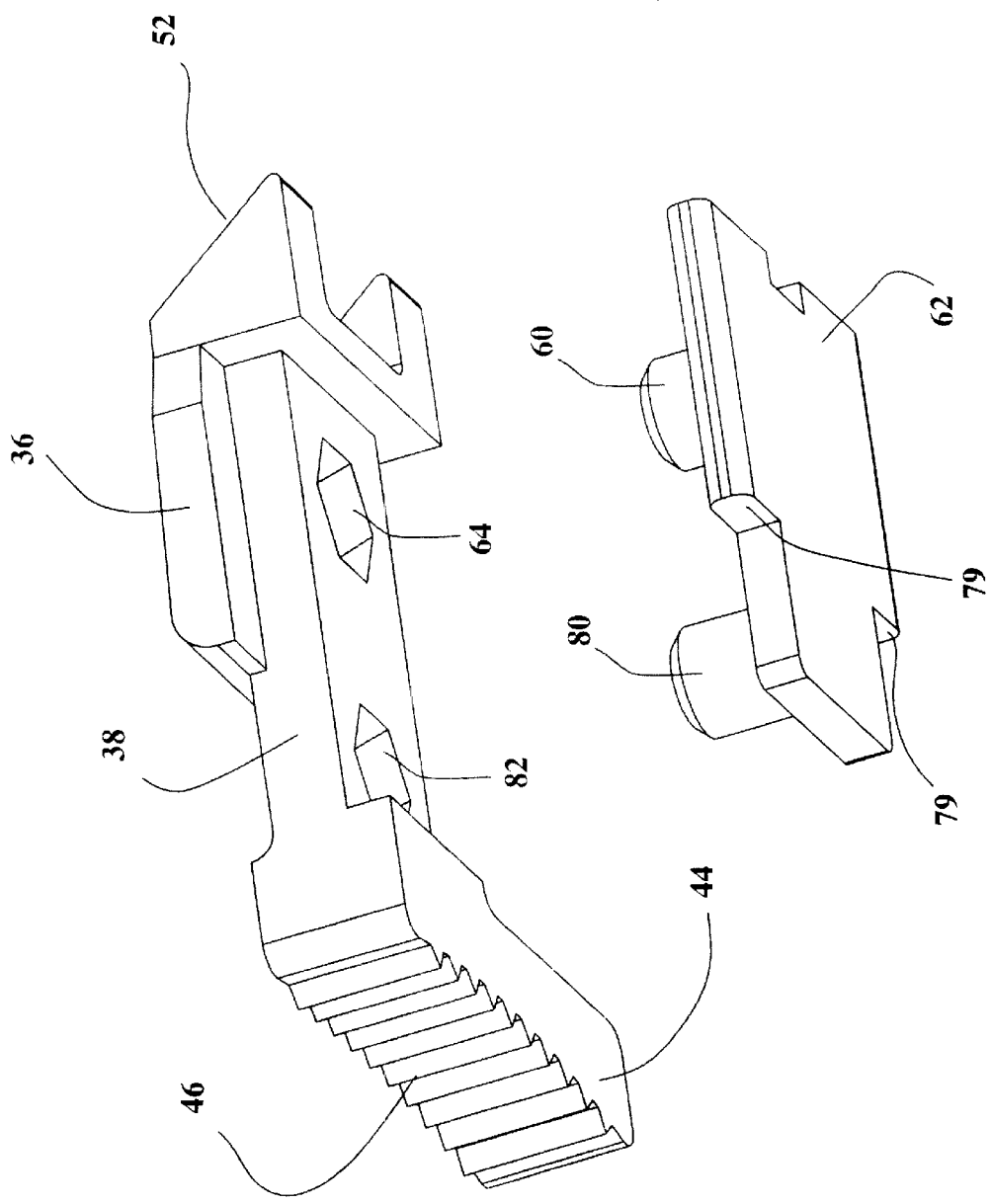
FIG. 14 is an exploded view of the release lever shown in and taken along line 14—14 in FIG. 13.

FIG. 14 illustrates the release lever 50 and slidable member 62 shown in and taken along line 14—14 of FIG. 13. FIG. 14 provides a clear view of aperture 64 on the lever 38. Stop plates 79 on the slidable member 62 also are clearly illustrated.

Figure 15:
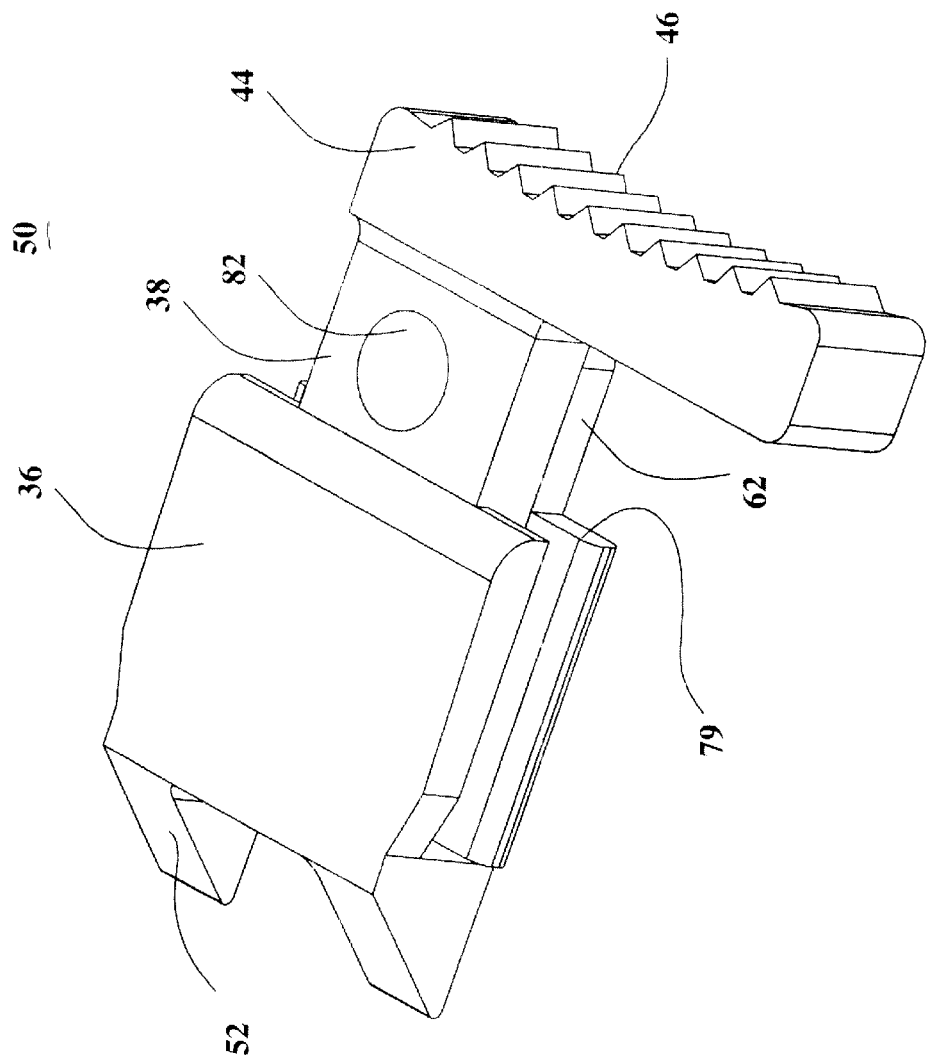
FIG. 15 is a perspective view of a third embodiment of a release lever configured in accordance with the present invention.

FIG. 15 illustrates the release lever 50 shown in FIGS. 13 and 14, wherein the aperture 82 is circular is shape.

Figure 16:
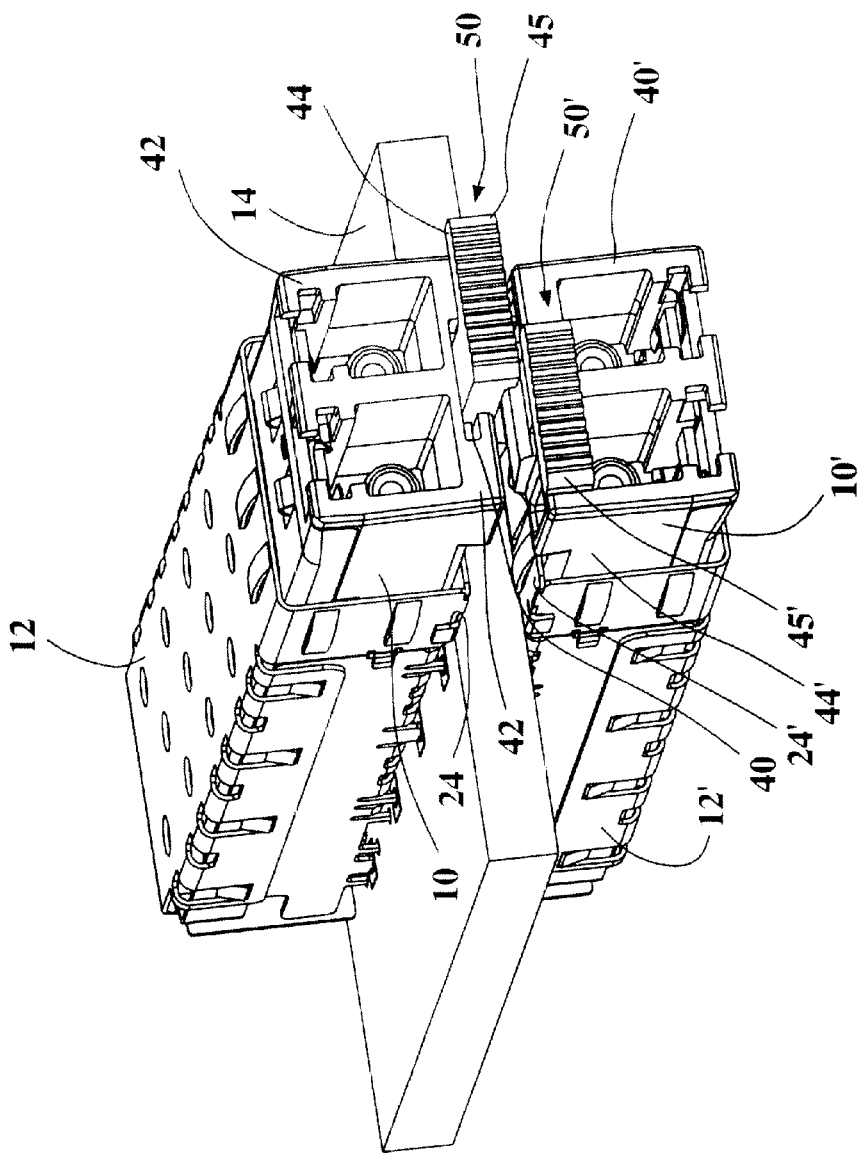
FIG. 16 is a perspective view of stacked transceiver modules, wherein foots on multiple release levers face opposite directions.

FIG. 16 illustrates an additional feature of the present invention. Two receptacles 12, 12', are mounted to a single PCB14. Two transceiver modules 10,10' are inserted into each receptacle 12, 12'. The base 24,24' of each receptacle 12,12' are mounted to the same PCB 14, thus positioning release levers 50,50' adjacent to each other.

In accordance with the present invention, foots 44, 44' of the release levers 50,50' of transceiver modules 10,10', within receptacles 12,12' mounted to a common PCB14, are extend in opposing directions in order to provide easier finger access to the release levers 50,50' for an operator. Toes 45,45' of foots 44,44' on release levers 50,50' are located are opposite sides of the face 40, 40' of each transceiver module 10,10'. This arrangement of opposing toes 45,45' on stacked transceiver modules 10,10' enables an operator to more easily press release lever 50 without accidentally pressing release lever 50', or vice versa. In this manner, transceiver modules can be closely stacked and still be easily removed by an operator with just the press of a finger.

Figure 17:
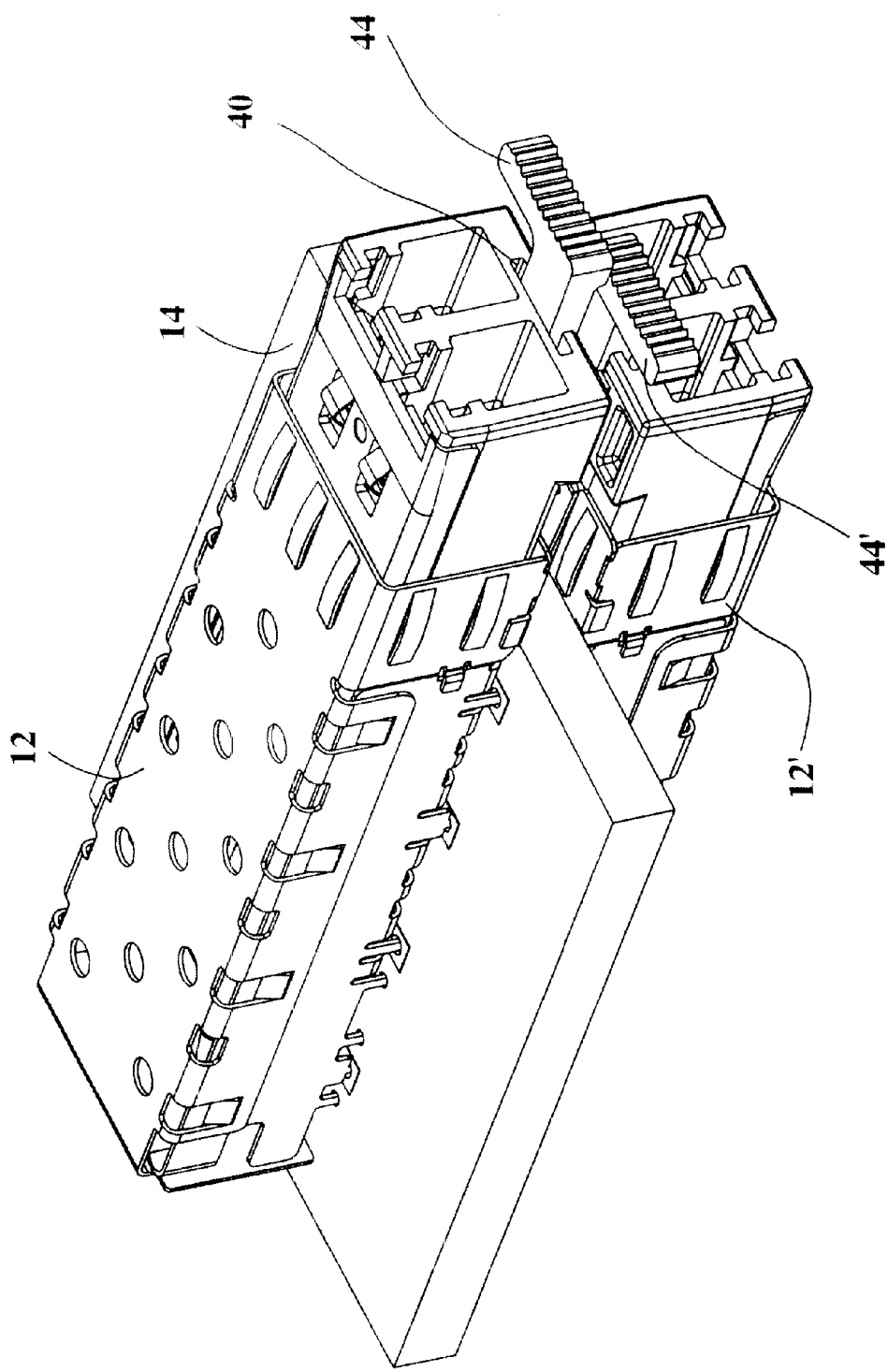
FIG. 17 is a perspective view of the stacked transceiver modules of FIG. 16, viewed from a different angle.

FIG. 17. is a perspective view of the stacked transceiver modules 10,10' shown in FIG. 16 from a different angle.

Figure 18:
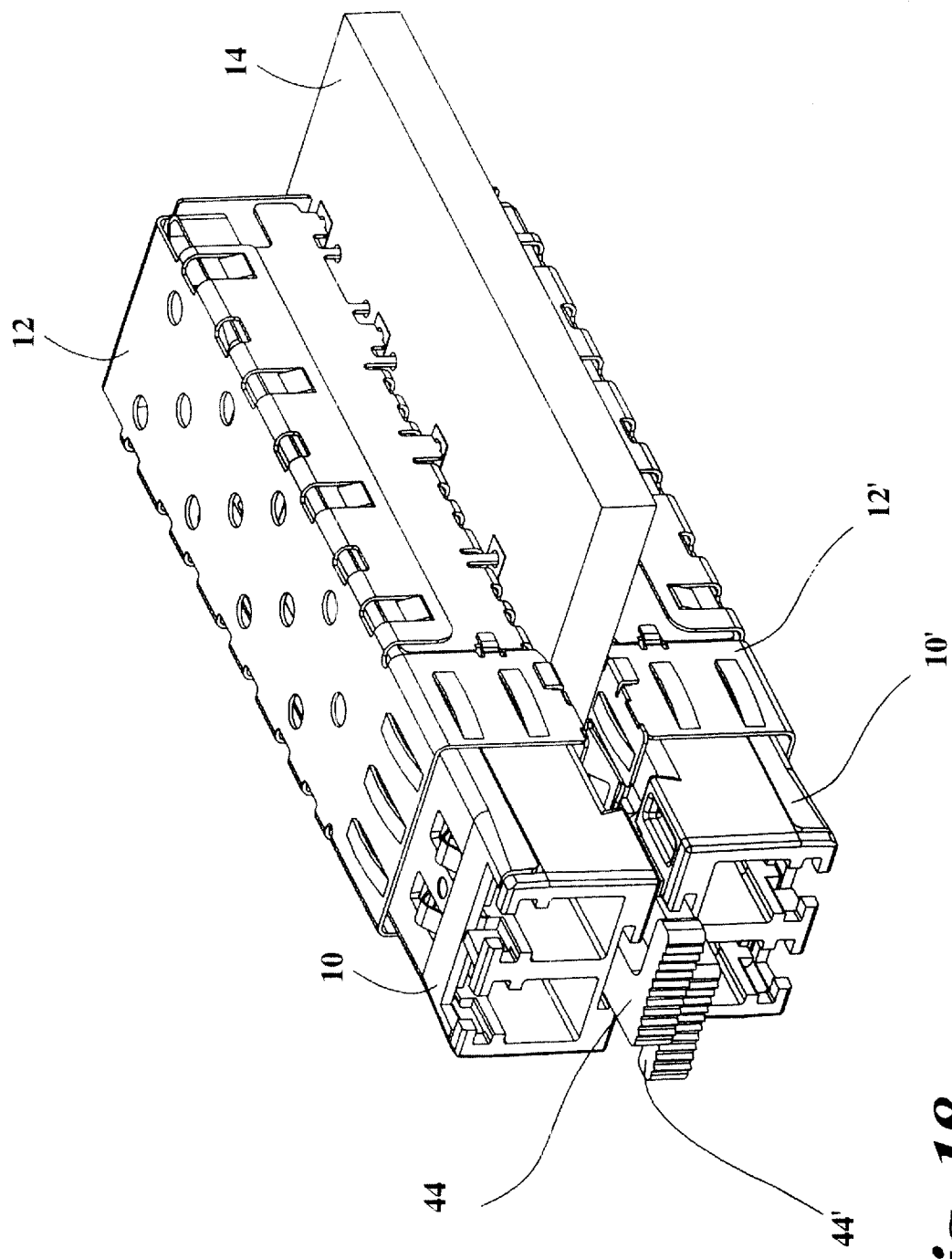
FIG. 18 is a perspective view of the stacked transceiver modules of FIG. 16, viewed from a different angle.

FIG. 18. is a perspective view of the stacked transceiver modules 10,10' shown in FIG. 16 from a different angle.

Figure 19:
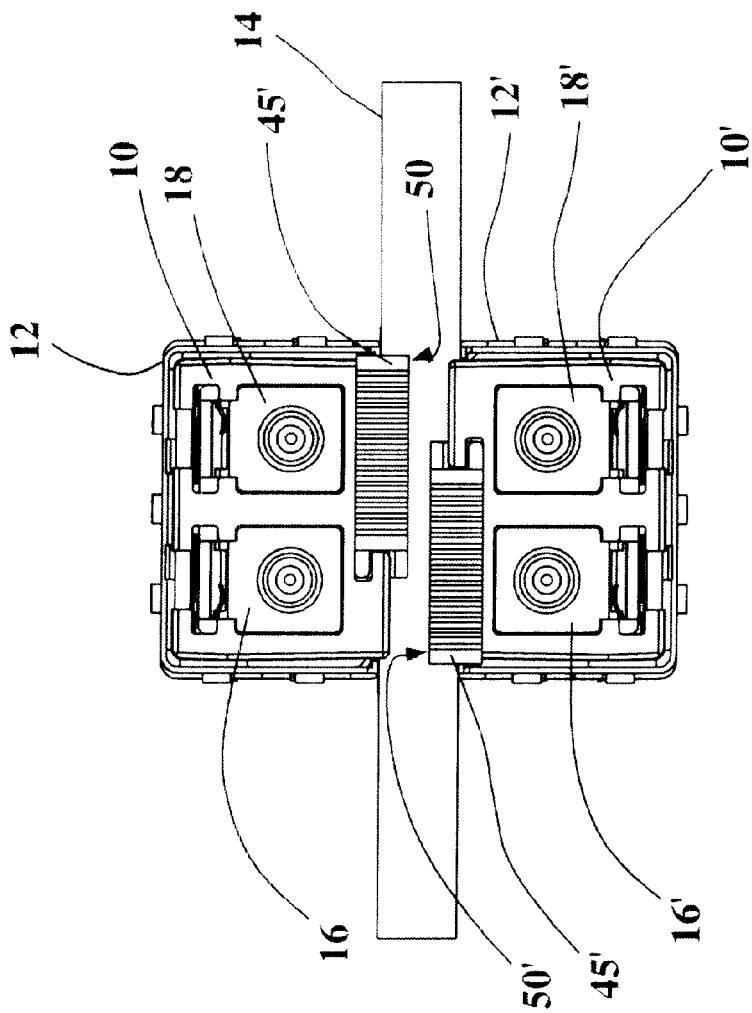
FIG. 19 is a front view of the stacked transceiver modules shown FIG. 16.

FIG. 19 is a front view of the stacked transceiver modules 10,10' shown in FIG. 16. In this view the optical inputs 16,16' and optical outputs 18,18' are more easily seen. Furthermore, the opposing locations of the toes 45,45' of the release levers 50,50' is easily distinguishable.

Figure 20:
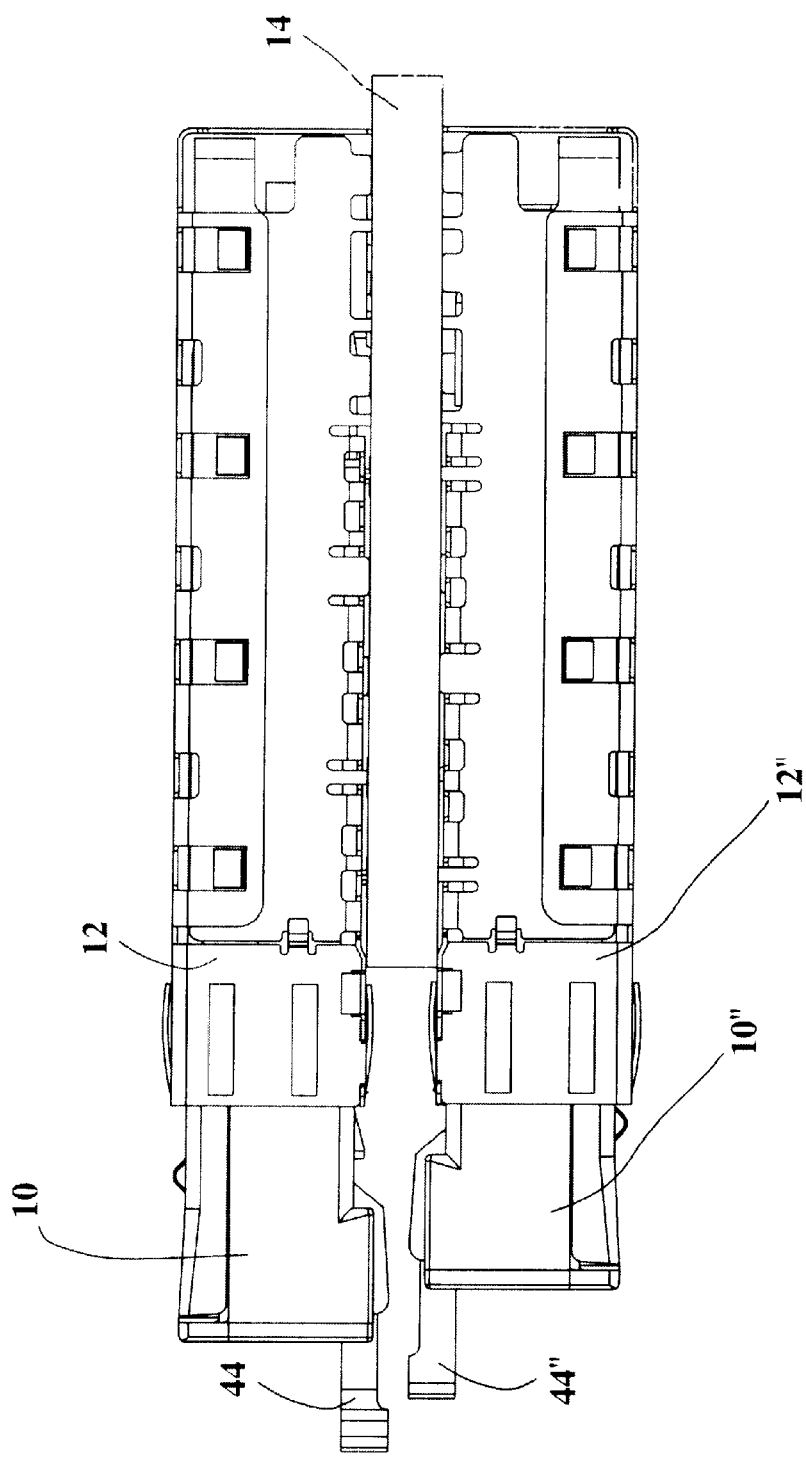
FIG. 20 is a side view of the stacked transceiver modules shown in FIG. 16.

FIG. 20 is a side view of the stacked transceiver modules 10,10' shown in FIG. 16.

Figure 21:
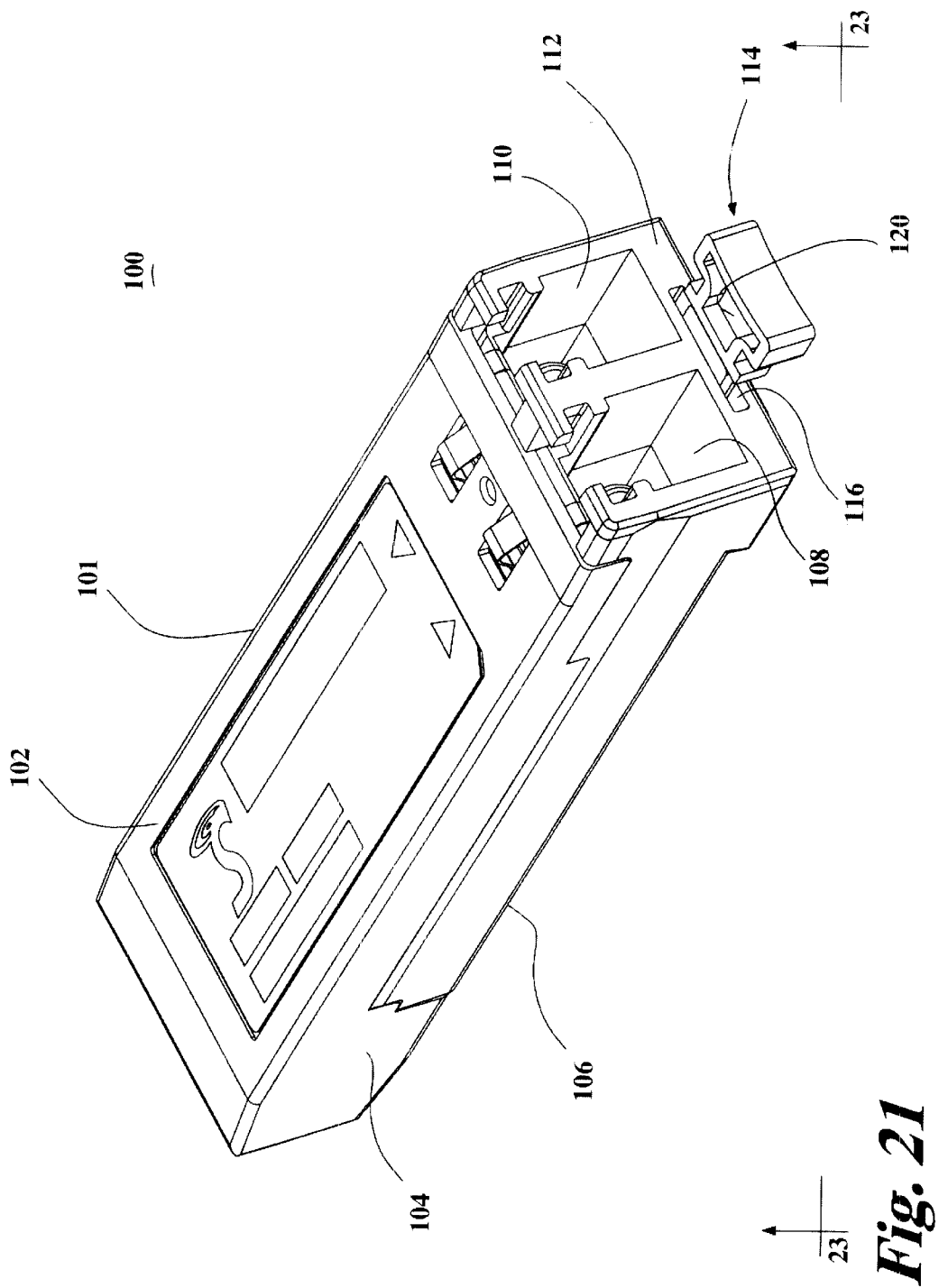
FIG. 21 is a perspective view of a transceiver module configured in accordance with a fourth embodiment of the present invention.

FIG. 21 shows a transceiver module 100 configured in accordance with a fourth embodiment of the present invention. A housing 101 includes a top 102, sides 104, and bottom 106. An input 108 and output 110 are shown at the front 112 of the housing 101. A release and removal lever 114 is shown extending out of a slot 116 in the front 112 of the housing 101.

In accordance with the present invention, the release and removal lever 114 includes a recess 120 at the end of the release and removal lever 114. A person can insert his or her fingernail into the recess 120 so as to provide a secure grip on the transceiver module 100 and remove the transceiver module 100. After an operator presses on the release and removal lever 114 in order to release the transceiver module 100 from a socket or receptacle, then the operator can remove the transceiver module 100 by inserting their fingernail into the recess 120 and pulling the transceiver module from the socket.

Figure 22:
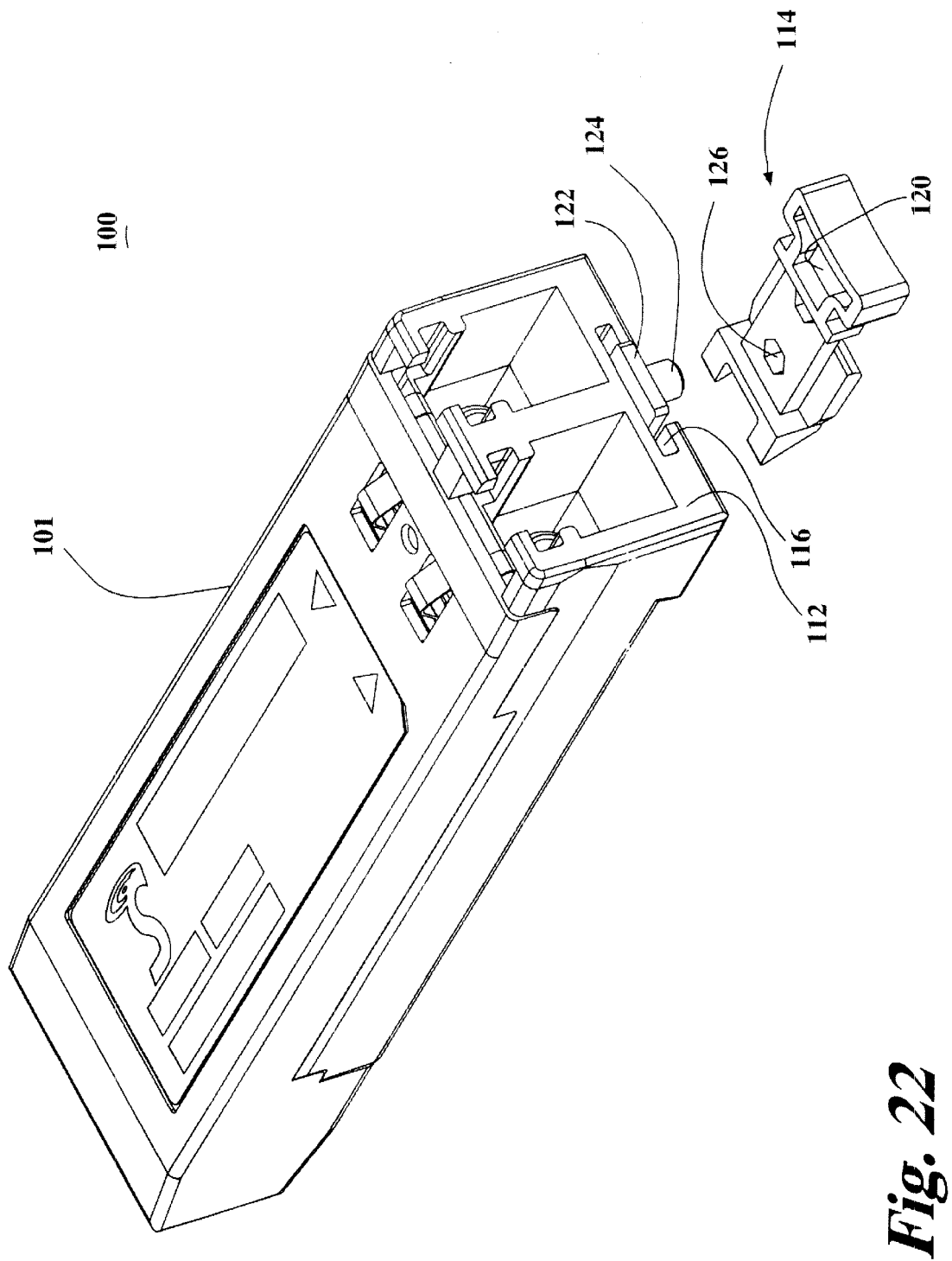
FIG. 22 is a perspective of the transceiver module shown in FIG. 21, wherein the release and removal lever is shown separated from the transceiver module.

FIG. 22 shows the release and removal lever 114 separated from the housing 101. A slidable member 122 is shown within the slot 116 in the front 112 of the housing 101. The slidable member includes tabs 124 for inserting into apertures 126 of the release and removal lever 114. In this manner, the release and removal lever 114 is mounted to the slidable member 122, and thereby the housing 101. The apertures 126 can tightly receive the tabs 124 in order to mount the release and removal lever 114 to the slidable member 122 without the need of adhesive. Of course, an adhesive also can be used to mount the release and removal lever 114 to the slidable member 122.

Figure 23:
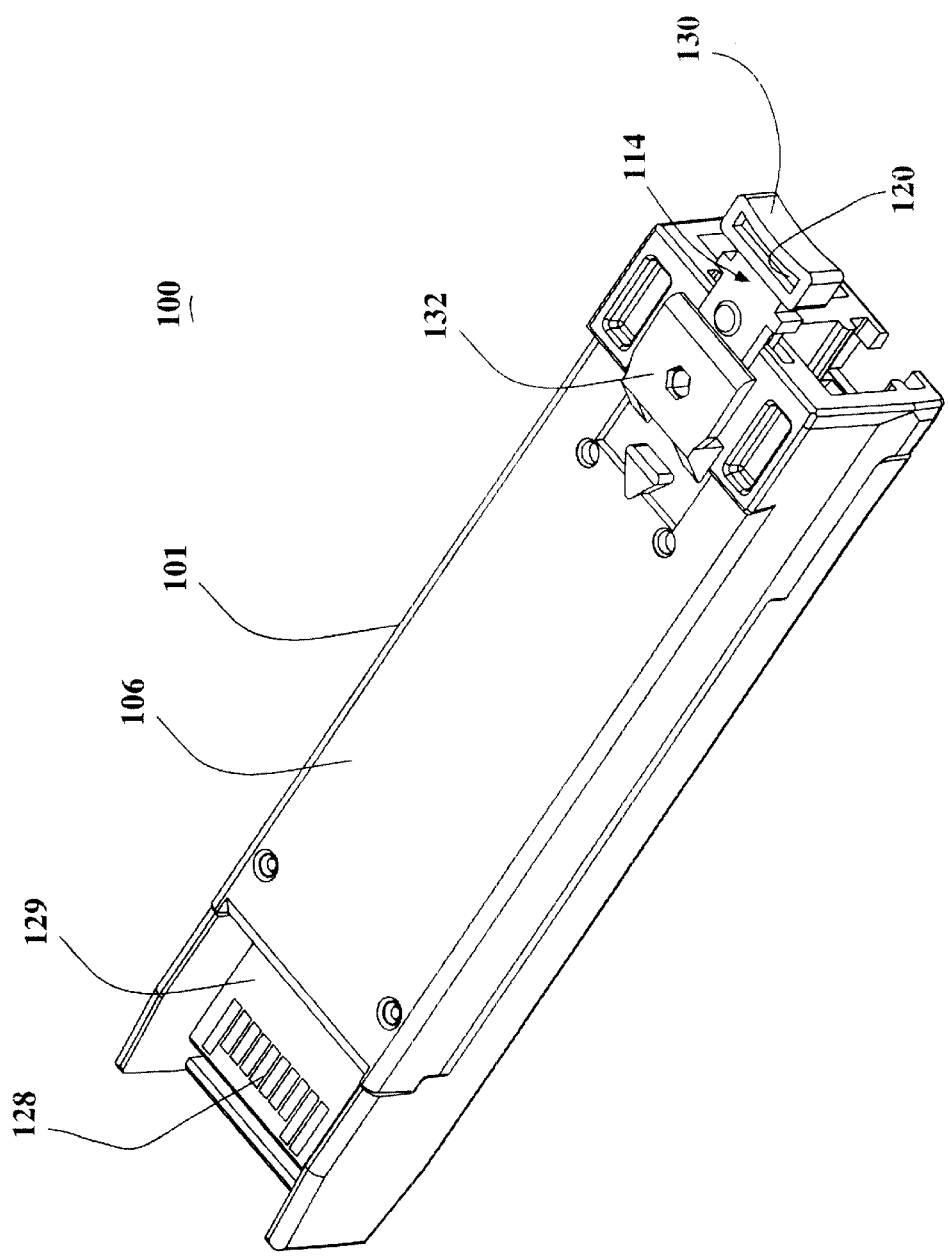
FIG. 23 is a perspective view of the transceiver module shown in and taken along line 23—23 of FIG. 21.

FIG. 23 shows the bottom 106 of the transceiver module 100. Contacts 128 are shown at the end of a printed circuit board 129 contained within the housing 101. The contacts 128 are exposed to mate with contacts of a socket when the transceiver module 100 is plugged into a socket. A knob 130 is shown at the end of the lever 114, wherein the recess 120 is located within the knob 130. A wedge 132 is shown at the opposite end of the release and removal lever 114. The wedge 132 functions in a manner as previously discussed above in regard to other embodiments to release the transceiver module 100 from a socket.

Figure 24:
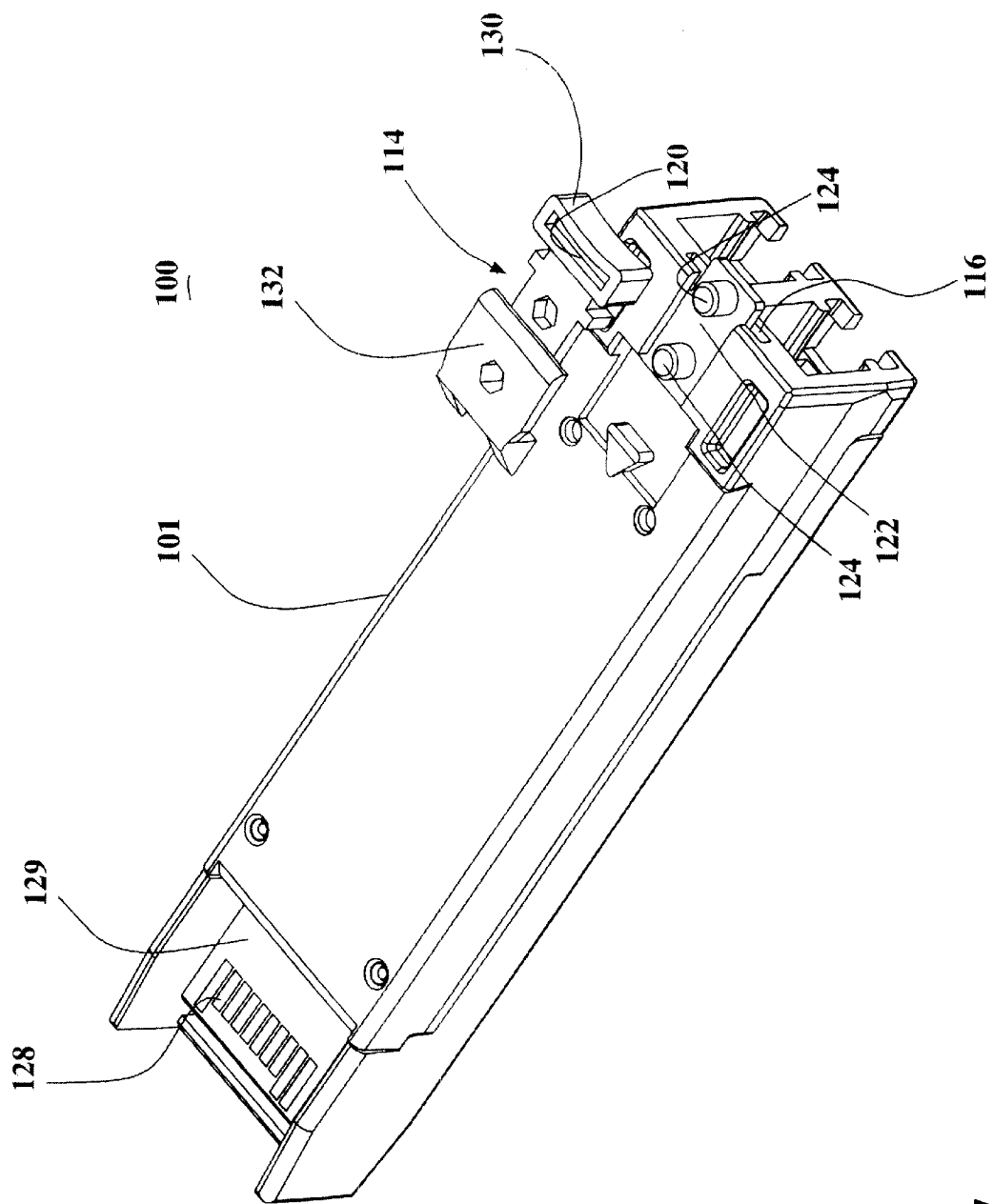
FIG. 24 is a perspective view of the transceiver module shown in FIG. 23, wherein the release and removal lever is shown separated from the transceiver module.

FIG. 24 shows the release and removal lever 114 separated from the housing 101. The slidable member 122 is shown within the slot 116. The lever 114 is shown, including the wedge 132, knob 130, and recess 120.

Figure 25:
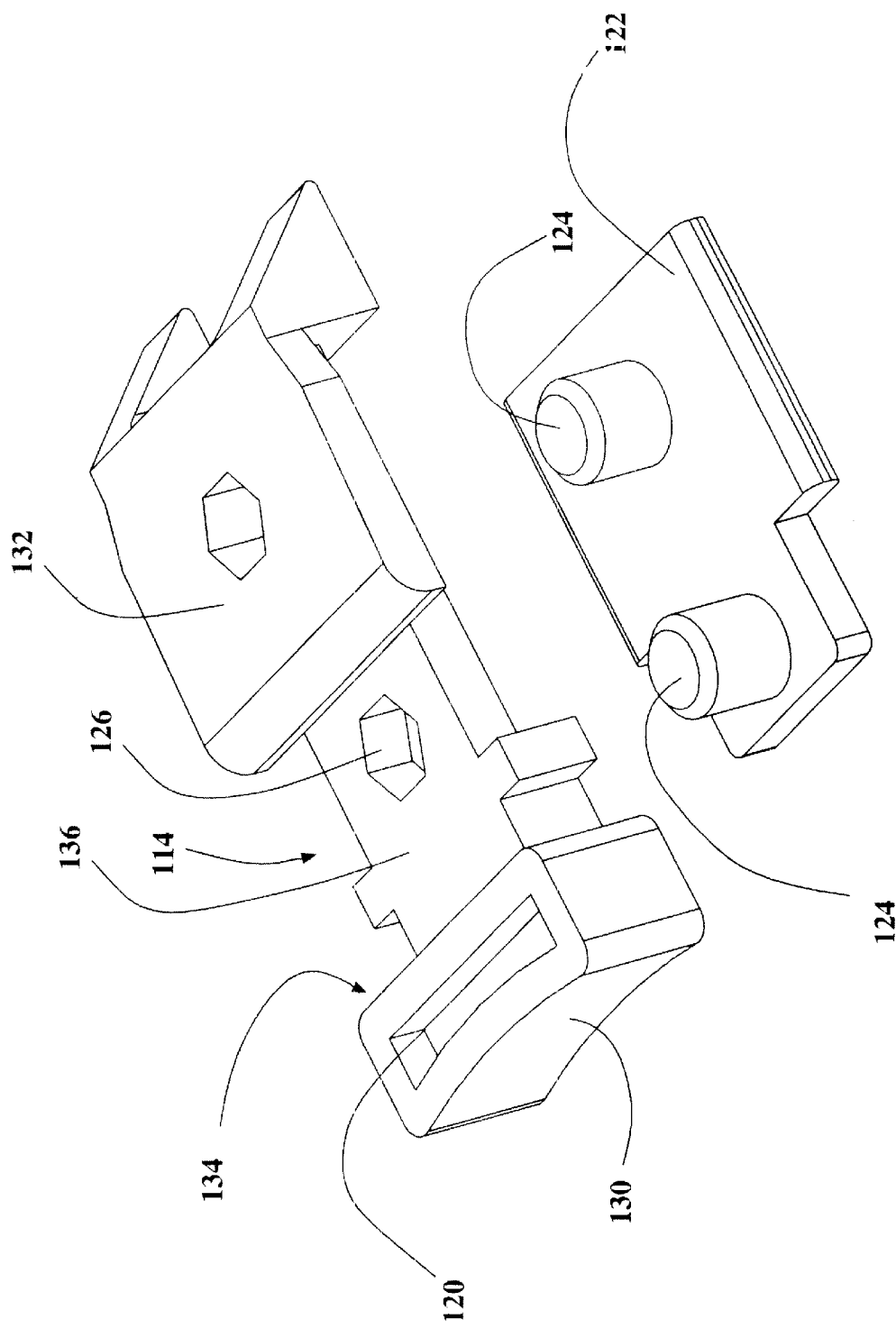
FIG. 25 is an exploded view of the release and removal lever shown in FIG. 24.
Figure 26:
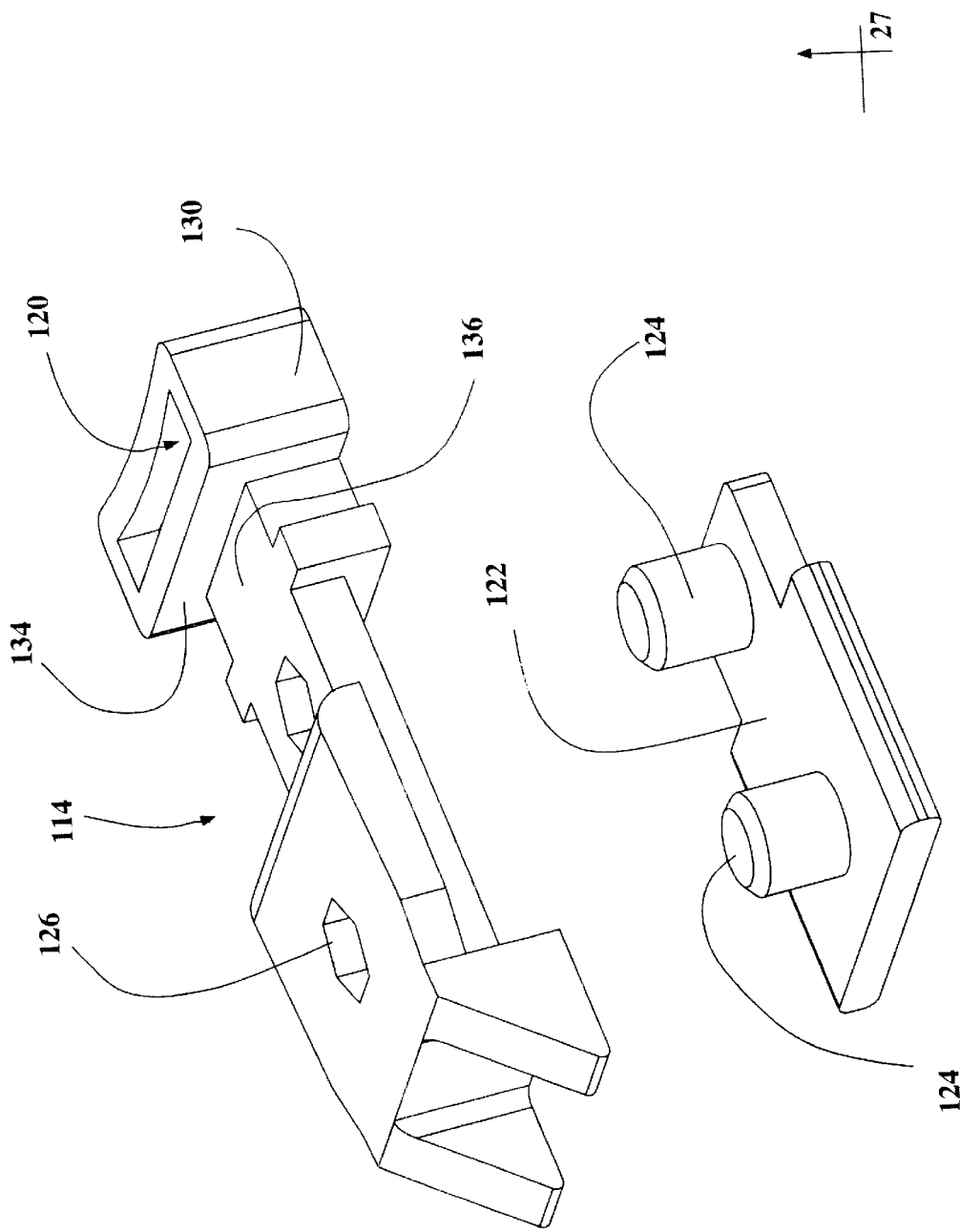
FIG. 26 is an exploded view of the release and removal lever shown in FIG. 24 from a different angle.
Figure 27:
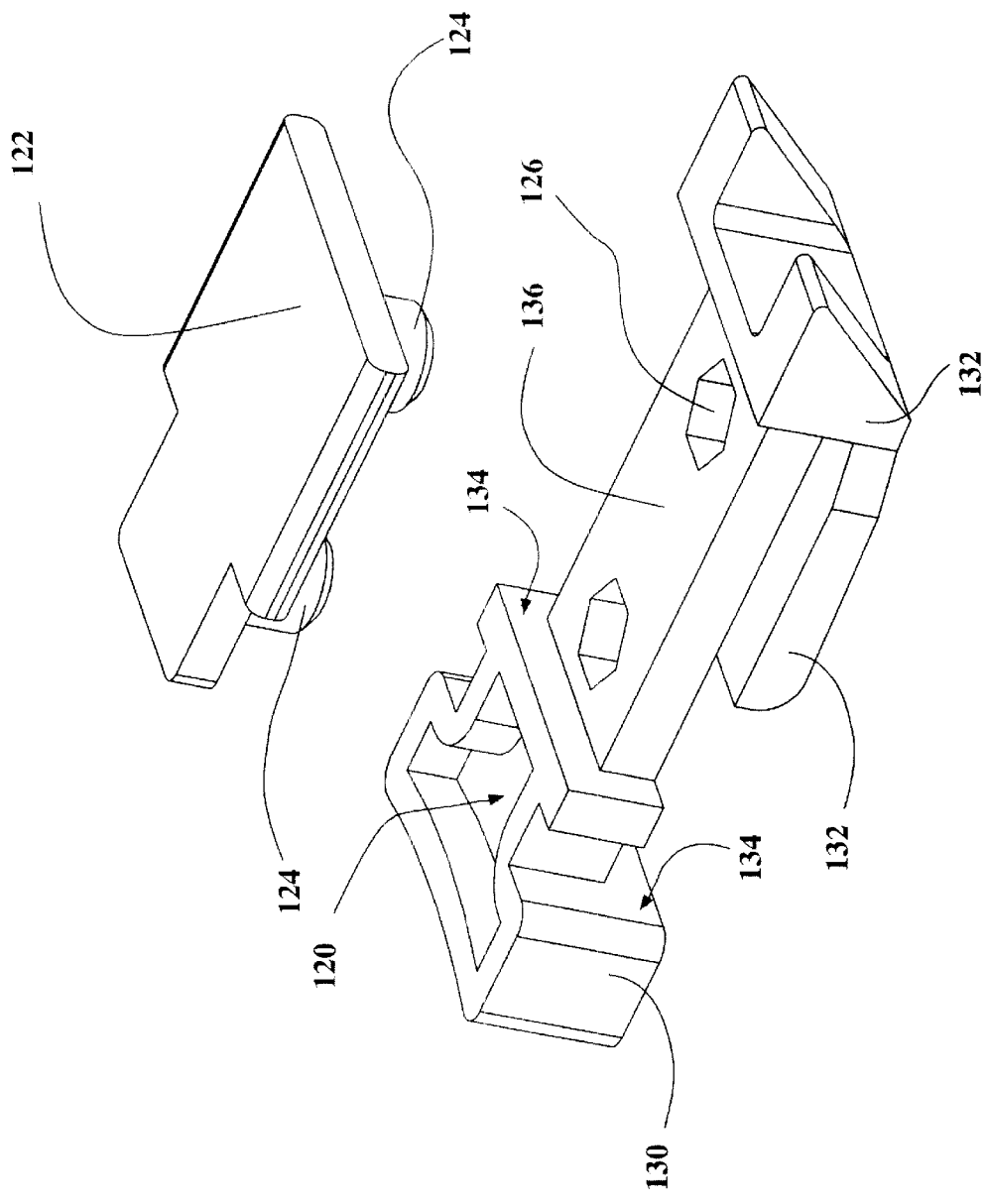
FIG. 27 is an exploded view of the release and removal lever shown in and taken along line 27—27 of FIG. 26.

FIGS. 25, 26, and 27 show enlarged, exploded views of the slidable member 122 and the release and removable member 114. An additional feature of the present invention is also illustrated. A ridge 134 is formed at the juncture between the knob 130 and an arm 136 of the release and removal lever 114. In addition to the recess 120, the ridge 134 provides an edge for an operator to grip and remove the transceiver module 100 from a socket. While the recess 120 is relatively small, the ridge 134 is larger in relative size and provides and edge that an operator may grip using his or her finger, instead of just a fingernail. In this manner, the transceiver module 100 may be initially removed using a fingernail within the recess 120. After the transceiver module 100 has been pulled out of a socket a short distance, an operator may get a better grip on the transceiver module 100 by gripping the ridge 134 with his or her finger or fingernail in order to completely remove the transceiver module 100 from a socket.

It is to be understood that the foregoing description is merely a disclosure of particular embodiments and is no way intended to limit the scope of the invention. Other possible modifications will be apparent to those skilled in the art and all modifications are to be defined by the following claims.

I claim as my invention:

1. A pluggable transceiver module, comprising:
   a housing having a first side and a face perpendicular to the first side, and a tab extending beyond the surface of the first side, and the tab sized to mate with a slot in a receptacle of a host device for receiving the pluggable transceiver module housing;
   a wedge slidably mounted on the first side proximate the tab;
   a lever slidably mounted to the first side of the housing and having an external end extending beyond the face of the housing;
   the wedge mounted to an internal end of the lever, wherein pressing the lever causes the wedge to slide between the tab and the slot on the receptacle and remove the tab from within the slot, thereby releasing the pluggable transceiver module from the receptacle; and
   said lever further including a recess on the external end enabling a person to at least partially insert a fingernail to grip and remove the pluggable transceiver module from a receptacle.

2. The pluggable transceiver of claim 1, further comprising:

a knob on the external end of the lever, wherein the recess is formed into the knob.

3. The pluggable transceiver of claim 2, further comprising:
 a ridge formed at a juncture between the external end of the lever and the knob, wherein the ridge also enables a person to grip and remove the pluggable transceiver module from within a receptacle.

4. The pluggable transceiver module of claim 1, wherein the lever is pressed towards the face of the pluggable transceiver module in order to release the pluggable transceiver module from a receptacle.

5. The pluggable transceiver module of claim 1, further comprising:
 a receptacle for receiving the pluggable transceiver module, the receptacle having a base including the slot for receiving the tab, whereby the first side of the pluggable transceiver module slides along the base during insertion of the pluggable transceiver module into the receptacle, and the tab enters the slot in order to secure the pluggable transceiver module within the receptacle.

6. The pluggable transceiver module of claim 1, wherein the tab is triangular in shape.

7. The pluggable transceiver module of claim 5, further comprising:
 a circuit board, and the base of the receptacle is mounted to the circuit board.

8. The pluggable transceiver module of claim 1, the lever comprising:
 a member slidably mounted to the first side of the housing, and the lever being mounted to the slidable member.

9. The pluggable transceiver module of claim 8, the slidable member including a plug and the lever including an aperture for receiving the plug, wherein the lever is positioned properly on the slidable member during mounting by inserting the plug into the aperture.

10. The pluggable transceiver module of claim 9, wherein the slidable member includes a second plug and the lever includes a second aperture, wherein the lever is positioned properly on the slidable member during mounting by inserting the second plug into the second aperture.

11. The pluggable transceiver module of claim 10, wherein the first and second plugs and the first and second apertures are sized to provide a tight fit when connected together, thereby eliminating the need for adhesive to bond the lever to the slidable member.

12. The pluggable transceiver module of claim 8, wherein the slidable member is slidably mounted within a slit that exits out the face in the pluggable transceiver module.

13. The connector module of claim 1, further comprising:
 an optical input socket and an optical output socket.

14. A pluggable transceiver module and receptacle, comprising:
 a receptacle of a host device for receiving a pluggable transceiver module, the receptacle having a base including a slot for receiving a tab of a pluggable transceiver module during insertion into the receptacle;
 a pluggable transceiver module having a housing with a first side and a face perpendicular to the first side, a tab extending beyond the surface of the first side, and the tab sized to mate with the slot in the receptacle, wherein the first side of the pluggable transceiver module slides along the base during insertion of the pluggable transceiver module into the receptacle, and the tab enters the slot in order to secure the pluggable transceiver module within the receptacle;
 a release and removal lever slidably mounted on the first side of the pluggable transceiver module proximate the tab, the release and removal lever having an external end extending beyond the face of the housing;
 a wedge mounted to an internal end of the release and removal lever, wherein pressing the release and removal lever causes the wedge to slide between the tab and the slot on the receptacle and remove the tab from within the slot, thereby releasing the transceiver module from the receptacle;
 a knob mounted to the external end of the release and removal lever, the knob including a recess that enables a person to at least partially insert a fingernail to easily grip and remove the pluggable transceiver module from the receptacle; and
 a ridge formed at a juncture between the external end of the lever and the knob, wherein the ridge also enables a person to grip and remove the pluggable transceiver module from the receptacle.

15. A pluggable transceiver module, comprising:
 a pluggable transceiver module having a housing with a first side and a face perpendicular to the first side, a tab extending beyond the surface of the first side, and the tab sized to mate with a slot in a receptacle, wherein the first side of the pluggable transceiver module slides along a base of the receptacle during insertion of the pluggable transceiver module into the receptacle, and the tab enters a slot in the base of the receptacle in order to secure the pluggable transceiver module within the receptacle;
 a release and removal lever slidably mounted on the first side of the pluggable transceiver module proximate the tab, the release and removal lever having an external end extending beyond the face of the housing;
 a wedge mounted to an internal end of the release and removal lever, wherein pressing the release and removal lever causes the wedge to slide between the tab and the slot on the receptacle and remove the tab from within the slot, thereby releasing the transceiver module from the receptacle;
 a knob mounted to the external end of the release and removal lever, the knob including a recess that enables a person to at least partially insert a fingernail to easily grip and remove the pluggable transceiver module from the receptacle; and
 a ridge formed at a juncture between the external end of the lever and the knob, wherein the ridge also enables a person to grip and remove the pluggable transceiver module from the receptacle.

* * * * *